United States Patent
Haymore et al.

(10) Patent No.: US 12,180,328 B2
(45) Date of Patent: Dec. 31, 2024

(54) STRONG BINDING METAL-CHELATING RESINS

(71) Applicant: Sachem, Inc., Austin, TX (US)

(72) Inventors: Barry L. Haymore, Avon, IN (US); Sara S. Moghaddam, Dripping Springs, TX (US); Charles B. Little, Austin, TX (US); Ari K. Kar, Bee Cave, TX (US)

(73) Assignee: SACHEM, INC., Austin, TX (US)

( * ) Notice: Subject to any disclaimer, the term of this patent is extended or adjusted under 35 U.S.C. 154(b) by 149 days.

(21) Appl. No.: 17/736,537

(22) Filed: May 4, 2022

(65) Prior Publication Data

US 2022/0380519 A1 Dec. 1, 2022

Related U.S. Application Data

(60) Provisional application No. 63/183,941, filed on May 4, 2021.

(51) Int. Cl.
*C08G 59/14* (2006.01)
*B01J 45/00* (2006.01)
(Continued)

(52) U.S. Cl.
CPC ............ *C08G 59/1477* (2013.01); *C02F 1/62* (2013.01)

(58) Field of Classification Search
None
See application file for complete search history.

(56) References Cited

U.S. PATENT DOCUMENTS

| 4,650,866 A | 3/1987 | Rayudu |
| 4,652,519 A | 3/1987 | Warshawsky et al. |

(Continued)

FOREIGN PATENT DOCUMENTS

| CN | 102505480 B | 8/2014 |
| CN | 104307495 A | 1/2015 |

(Continued)

OTHER PUBLICATIONS

F. Yunta et al., "Chelating Agents Related to Ethylenediamine Bis(2-hydroxyphenyl)acetic Acid (EDDHA): Synthesis, Characterization, and Equilibrium Studies of the Free Ligands and Their Mg2+, Ca2+, Cu2+, and Fe3+ Chelates," Inorganic Chemistry, vol. 42, No. 17, Jul. 30, 2003, pp. 5412-5421.

(Continued)

*Primary Examiner* — Randy P Gulakowski
*Assistant Examiner* — Ha S Nguyen
(74) *Attorney, Agent, or Firm* — Michael E. Carmen; Ryan, Mason & Lewis, LLP

(57) ABSTRACT

A metal-chelating resin includes (a) a compound represented by Formula (I):

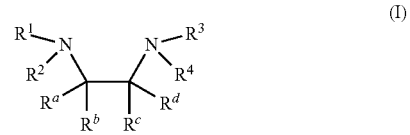

or a stereoisomeric form thereof or a salt thereof, wherein $R^1$, $R^2$, $R^3$, $R^4$, $R^a$, $R^b$, $R^c$ and $R^d$ are as defined herein; and (b) an organic polymer resin having at least one comple- (Continued)

mentary reactive functional group covalently linked with at least one linking group of the compound represented by Formula (I).

16 Claims, 1 Drawing Sheet

(51) Int. Cl.
    *B01J 47/016*     (2017.01)
    *C02F 1/42*     (2023.01)
    *C02F 1/62*     (2023.01)

(56) References Cited

U.S. PATENT DOCUMENTS

| | | | |
|---|---|---|---|
| 5,874,573 | A | 2/1999 | Winchell et al. |
| 5,962,183 | A | 10/1999 | Rahman et al. |
| 6,646,157 | B2 | 11/2003 | McKearin |
| 6,774,228 | B1 | 8/2004 | Parker et al. |
| 8,431,734 | B2 | 4/2013 | Nawrocki et al. |
| 2006/0030619 | A1 | 2/2006 | Liu et al. |
| 2007/0274945 | A1* | 11/2007 | Scott .............. A61P 39/04 525/438 |
| 2014/0058072 | A1 | 2/2014 | Bhushan et al. |
| 2014/0073780 | A1 | 3/2014 | Bhushan et al. |
| 2014/0086846 | A1* | 3/2014 | Grimmond .......... A61K 49/126 424/9.1 |
| 2014/0088314 | A1* | 3/2014 | Grimmond ......... C07F 9/65586 558/158 |
| 2014/0142298 | A1 | 5/2014 | Denat et al. |
| 2015/0336996 | A1 | 11/2015 | Caravan et al. |
| 2015/0361116 | A1 | 12/2015 | Lamarque et al. |
| 2018/0194766 | A1 | 7/2018 | Tatum et al. |
| 2020/0254398 | A1 | 8/2020 | Hamzik et al. |
| 2022/0105476 | A1 | 4/2022 | Hamzik et al. |

FOREIGN PATENT DOCUMENTS

| | | |
|---|---|---|
| CN | 106824124 A | 6/2017 |
| CN | 107353360 A | 11/2017 |
| EP | 0299795 B1 | 3/1992 |
| EP | 0523572 A1 | 1/1993 |
| EP | 0290041 B1 | 12/1993 |
| GB | 2292943 A | 3/1996 |
| WO | 1989001476 A1 | 2/1989 |
| WO | 1992022583 A2 | 12/1992 |
| WO | 1993003045 A1 | 2/1993 |
| WO | 1997044313 A1 | 11/1997 |
| WO | 1999033521 A1 | 7/1999 |
| WO | 2001045696 A1 | 6/2001 |
| WO | 2001046114 A1 | 6/2001 |
| WO | 2007028639 A1 | 3/2007 |
| WO | 2010099536 A2 | 9/2010 |
| WO | 2010133907 A1 | 11/2010 |
| WO | 2014052087 A1 | 4/2014 |
| WO | 2014107722 A1 | 7/2014 |
| WO | 2016207265 A1 | 12/2016 |
| WO | 2016207266 A1 | 12/2016 |
| WO | 2017007807 A1 | 1/2017 |
| WO | 2017027834 A1 | 2/2017 |
| WO | PCT/US2022/027634 | 7/2022 |

OTHER PUBLICATIONS

Christina H. Taliafero, et al., "New Multidentate Ligands XXVI N,N' -Bis (2-Hydroxybenzyl) Ethylenediamine—N,N' -Bis(Methylenephosphonic acid monomethyl ester), and N,N' -Bis (2-Hydroxybenzyl) Ethylenediamine—N,N' -Bis (Methylenephosphonic acid monomethyl ester): New chelating legands for trivalent metal ions," Journal of Coordination Chemistry, Jul. 13, 1989, pp. 249-264, vol. 13. No. 3.

A. E. Martell, et al., "New chelating agents suitable for the treatment of iron overload, Inorganica Chimica Acta", Aug. 1, 1999, pp. 238-246, vol. 291, No. 1-2.

Hayal Bulbul Sonmez, et al., "An alternative approach for grafting of acrylate esters from crosslinked polystyrene beads by ATRP and their modification for selective mercury extraction," React. Funct. Polym., 2004, pp. 33-41 61(1).

Sadhan Pramanik, et al., "A chelating resin containing bis(2-benzimidazolylmethyl)amine: synthesis and metal-ion uptake properties suitable for analytical application." Talanta, 2004, pp. 485-490, 63(2).

F. Barbette, et al., "Extraction of uranyl ions from aqueous solutions using silica-gel-bound macrocycles for alpha contaminated wastewater treatment," Anal. Chim. Acta, 2004, pp. 179-187, 502(2).

Veronique Montembault, et al., "Synthesis and complexing properties of resins containing aminocarboxylic acid as functional groups from diethylenetriaminepentaacetic acid bisanhydride and polyvinyl alcohols," React. Funct. Polym . . . 1999, pp. 253-261, 39(3).

Spiro D. Alexandratos, et al. "Design of novel polymer-supported reagents for metal ion separations," ACS Symp. Ser., 1999, pp. 194-205.

J. M. Sanchez, et al., "New macroporous polymers for the selective adsorption of gold (III) and palladium (Ii). I. The synthesis, characterization, and effect of spacers on metal adsorption," J. Polym. Sci., Part A: Polym. Chem., 2000, pp. 269-278, 38(2).

Michael Zachariou, et al., "Immobilized metal ion affinity chromatography of proteins," Methods Mol. Biol. (Totowa, NJ, U.S.) 251 (HPLC of Peptides and Proteins), 2004, pp. 89-102.

R. K. Dey, et al. "Studies of metal ion uptake behaviour of formaldehyde condensed resins of phenolic Schiff bases derived from the reaction of 4,4'-diaminodiphenyl and 4,4'-diaminodiphenylmethane with o-hydroxybenzaldehyde," Indian J. Chem. Technol., 2004, pp. 695-703, 11(5).

Adam Charlton, et al., "Immobilized metal ion affinity chromatography of histidine-tagged fusion proteins," Methods Mol. Biol. (Totowa, NJ, U.S.) 421 (Affinity Chromatography (2nd Edition)), 2008, pp. 137-149.

Ata Makarem, et al., "A Convenient Synthesis for HBED-CC-tris(tert-butyl ester)," Synlett, 2018. pp. 1239-1243, 29(9).

Christian Maurer, et al., "Dioximate- and bis(salicylaldiminate)-bridged titanium and zirconium alkoxides: Structure elucidation by mass spectrometry," Chem. Plus. Chem., 2013, pp. 343-351, 78(4).

Xing Man Xu, et al., "Syntheses, characterization and DNA cleavage studies of acyclic copper(II) complexes," Transition Met. Chem. (Dordrecht, Neth.), 2004, pp. 658-662, 29(6).

Albert E. Frost, Jr., et al., "The Preparation and properties of some N,N'-dialkylethylene-diaminediacetic acids," J. Am. Chem. Soc., 1950, pp. 3743-672, vol. 72.

Michelle K. Taylor, et al., "The effect of donor groups and geometry on the redox potential of copper Schiff base complexes," Inorg. Chim. Acta., 2006, pp. 2455-2464, 359(8).

Sylvain Routier, et al., "Synthesis of a functionalized salen-copper complex and its interaction with Dna," J. Org. Chem., 1996, pp. 2326-2331, 61(7).

Marzena Bialek, et al., "Bidentate [N, N] nickel complexes with salen type ligands for polymerization of methyl methacrylate," Polimery (Warsaw, Pol.), 2008, pp. 883-887, 53(11/12).

Markus Scholl, et al., "Controlling Polymer Architecture in the Thermal Hyperbranched Polymerization of L-Lysine," Macromolecules (Washington, DC, U.S.), 2007, pp. 5726-5734, 40(16).

Sylvain Routier, et al., "Highly preferential cleavage of unpaired guanines in DNA by a functionalized salen-nickel complex," Bioorg. Med. Chem. Lett., 1997, pp. 63-66, 7(1).

N. Kahana,, et al., "A Conceptual Approach to the Synthesis of Bifunctional EDTA Analogs: EDTA-Extended Polyamides," J. Org. Chem., 1994, pp. 4832-4837, 59(17).

A. Warshawsky, "Chelating ion exchangers," Crit. Rep. Appl. Chem., 1987, pp. 166-225, 19.

Janina Altman, et al., "The synthesis of vicinal diacylamines via Bamberger ring cleavage of substituted imidazoles, 1,2,4-Triacylaminobutanes bearing different acyl groups," Isr. J. Chem., 1986, pp. 29-32, 27(1).

(56) References Cited

OTHER PUBLICATIONS

Sara J. Krivickas, et al., Effective Methods for the Biotinylation of Azamacrocycles. J. Org. Chem., 2007, pp. 8280-8289, 72(22).
Nevenka Cakic, et al., "Synthetic strategies for preparation of cyclen-based MRI contrast agents Synthesis of specifically deuterium labeled sulfur and oxygen ether side-chain-extended antileukemic (2-chloroethyl) nitrosoureas and study of their products and pathways of decomposition under physiological conditions," Tetrahedron Lett., 2015, pp. 759-765, 56(6).
Charles N. Moorefield, et al., "Eight-membered and larger rings," Prog. Heterocycl. Chem., 2009, pp. 459-475, 20.
Martina Delbianco, et al., "Highly Water-Soluble Triazacyclononane Europium Complexes to Detect Ligand Binding with Time-Resolved FRET Microscopy," Angew. Chem., Int. Ed., 2014, pp. 10718-10722, 53(40).
Mokhtar Dardouri, et al., "Aminoalkylated Merrifield Resins Reticulated by Tris-(2-chloroethyl) Phosphate for Cadmium, Copper, and Iron (II) Extraction," Int. J. Polym. Sci., 2015, pp. 1-7.
Nacer Ferrah, et al., "Removal of copper ions from aqueous solutions by a new sorbent: polyethyleneiminemethylene phosphonic acid," Desalination, 2011, pp. 17-24, 269(1-3).
Rongjun Qu, et al., "Removal and Separation of Hg(II) Ions from Aqueous Solutions by Macroporous Polystyrene-co-Divinylbenzene-Supported Polyamine Chelating Resins," J. Chem. Eng. Data, 2010, pp. 4650-4659, 55(11).
Xiao Zhao, et al., "Tetrahydrosalen Uranyl(VI) Complexes: Crystal Structures and Solution Binding Study," Eur. J. Inorg. Chem., 2018, pp. 1185-1191, 2018(10).
Sylvain Routier, et al., "Salen-anthraquinone conjugates. Synthesis, DNA-binding and cleaving properties, effects on topoisomerases and cytotoxicity," Bioorg. Med. Chem., 1996, pp. 1185-1196, 4(8).
Thomas J. McMurry, et al., "Convenient synthesis of bifunctional tetraaza macrocycles. Bioconjugate Chem." 1992, pp. 108-117, 3(2).
Yong Huang, et al., "An Efficient Synthesis of N, N, N-Substituted 1,4,7-Triazacyclononane," Eur. J. Org. Chem., 2018, pp. 1546-1551, 2018(13).
Rebecca C. Hoye, et al., "Synthesis of Polyazamacrocyclic Compounds via Modified Richman-Atkins Cyclization of I²-Trimethylsilylethanesulfonamides," J. Org. Chem., 2001, pp. 2722-2725, 66(8).
Vicente Marti-Centelles, et al., "Macrocyclization Reactions: The Importance of Conformational, Configurational, and Template-Induced Preorganization," Chem. Rev. (Washington, DC, U.S.), 2015, pp. 8736-8834, 115(16).
Pauline Desogere, et al., "Efficient Synthesis of 1,4,7-Triazacyclononane and 1,4,7-Triazacyclononane-Based Bifunctional Chelators for Bioconjugation," Eur. J. Org. Chem., 2014, pp. 7831-7838, 2014(35).
Sophie Poty, et al., "MA-NOTMP: A Triazacyclononane Trimethylphosphinate Based Bifunctional Chelator for Gallium Radiolabelling of Biomolecules," Chem. Med. Chem., 2015, pp. 1475-1479, 10(9).
Jinshan Chen, et al., Synthesis of 12-membered macrocyclic templates and library analogs for PPI, Tetrahedron Lett., 2013, pp. 3298-3301, 54(25).
Pier Giorgio Cozzi, "Metal-Salen Schiff base complexes in catalysis: practical aspects," Chem. Soc. Rev., 2004, pp. 410-421, (7).
S. Fernandez-Puig, et al., "Modified Merrifield's resin materials used in capturing of Pb(II) ions in water," Mater. Res. Express 6, 2019, 12 pages, 115104, 6(11).
Krzysztof E. Krakowiak, et al., "Preparation of a variety of macrocyclic di- and tetraamides and their peraza-crown analogs using the crab-like cyclization reaction," J. Heterocycl. Chem., 1990, pp. 1585-1589, 27(6).
D. Allen Annis, et al., "Polymer-supported chiral Co(salen) complexes: synthetic applications and mechanistic investigations in the hydrolytic kinetic resolution of terminal epoxides," J. Am. Chem. Soc., 1999, pp. 4147-4154, 121(17).
Anais Zulauf, et al., "Recoverable chiral salen complexes for asymmetric catalysis: recent progress," Dalton Trans., 2010, pp. 6911-6935, (30).
Dexuan Huang, et al., "Immobilized complexes of the salen Schiff's base with metal as oxidation catalysts," Russ. J. Gen. Chem., 2013, pp. 2361-2369, 83(12).
Francisco Galindo, et al., "A Sensitive Colorimetric Method for the Study of Polystyrene Merrifield Resins and Chloromethylated Macroporous Monolithic Polymers," J. Comb. Chem., 2004, pp. 859-861, (6).
Talha M. Gokmen, et al., "Porous polymer particles—A comprehensive guide to synthesis, characterization, functionalization and applications," Prog. Polym. Sci., 2012, pp. 365-405, 37(3).
Viviane G. Teixeira, et al., "Morphological study on the reactivity of styrene-divinylbenzene copolymers in a chloromethylation reaction." J. Appl. Polym. Sci., 2010, pp. 2389-2396 118(4).
Georgina E. Pina-Luis, et al, "Sensitive single step fluorimetric method for monitoring solid-phase reactions on polystyrene resin-bound chloride groups," J. Braz. Chem. Soc., 2011, pp. 1024-1032, 22(6).
Viviane G. Teixeira, et al., "Determination of accessible chloromethyl groups in chloromethylated styrene-divinylbenzene copolymers.," J. Braz. Chem. Soc., 2005, pp. 951-956, 16(5).
Mi Sun Pyun, et al, "Synthesis of bifunctional chelating agent derived from lysine and its radiolabeling with 99mTc," Bull. Korean Chem. Soc., 2009, pp. 1187-1189, 2009.
Jingdan Hu, et al., "J. A New Method for the Synthesis of Nîµ-Acetyl-Nîµ-hydroxy-L-lysine, the Iron-Binding Constituent of Several Important Siderophores," J. Org. Chem., 1994, pp. 4858-4861, 59(17).
Arumugam Thangavel, et al., "1,4,7-Triazacyclononane Ligands Bearing Tertiary Alkyl Nitrogen Substituents," Inorg. Chem., 2013, pp. 13282-13287, (22).
P. Florio et al., "An efficient synthesis of 1,3-bis(1,4,7-triazacyclonon-1-yl)-2-hydroxypropane, [1,3-bis(TACN)-2-propanol]," Green Chem. Lett. Rev., 2012, pp. 251-254, 5(3).
Zoltan Koacs, et al., "A general synthesis of mono- and disubstituted 1,4,7-triazacyclononanes," Tetrahedron Lett., 1995, 92269-9272, 36(51).
Jacob Golenser, et al., "Iron chelators: correlation between effects on *Plasmodium* spp. and immune functions," J. Parasitol., 2006, pp. 170-177 (1).
Thomas, Muntener, et al., "Synthesis of chiral nine and twelve-membered cyclic polyamines from natural building blocks," Chem. Commun. (Cambridge, U.K.), Mar. 2019, pp. 4715-4718, (32).
Ata Makarem, et al., "HBED-NN: A Bifunctional Chelator for Constructing Radiopharmaceuticals," J. Org. Chem. 2019, pp. 7501-7508, (11).
Feng Liang, et al., "A convenient synthesis of octahydropyrazino[1,2-a]pyrazine," Synthetic Communications, 2004, pp. 845-851, 34(5).
Feng Liang, et al., "Synthesis and antitumor activities of hydroxyl-substituted macrocyclic polyamines and their complexes," Chem. J. Internet, 2003, 3 pages, 5(1).
Guo Ping Xue, et al., "A practical synthesis of novel hydroxyl-substituted macrocyclic triamines, tetramines, and hexamines," Chinese Journal of Chemistry, 1998, pp. 538-541, 16(6).
Jochen Schuhmacher, et al., "A bifunctional HBED-derivative for labeling of antibodies with gallium-67, indium-111 and iron-5. Comparative biodistribution with 111In-DPTA and iodine-131-labeled antibodies in mice bearing antibody internalizing and non-internalizing tumors," Nucl. Med. Biol., 1992, pp. 809-824, 19(8).
Nicholas E. Leadbeater, et al., "Preparation of Polymer-Supported Ligands and Metal Complexes for Use in Catalysis," Chem. Rev., 2002, pp. 3217-3273, 02(10).
Henna Pesonen, et al., "Synthesis, structure, and complexation properties of hydroxybenzyl analogs of diethylenetriaminepentaacetic acid," Journal of Coordination Chemistry, 2010, pp. 2026-2041, 63(12).
Shigeki, Kobayashi, et al., "Development of new double-stranded phenylalanyl chelators using N-X diagrams and binding constants for chelators and lanthanide ions," Chem. Pharm. Bull., 2010, pp. 620-627, 58(5).

(56) References Cited

OTHER PUBLICATIONS

Frederik Cleeren, et al., "New Chelators for Low Temperature Al18F-Labeling of Biomolecules," Bioconjugate Chem., 2016, pp. 790-798, 27(3).
William J. McBride, et al., "The radiolabeling of proteins by the [18F]AlF method," Applied Radiation Isotopes, 2012, pp. 200-204, 70(1).
Edit Y. Tshuva, et al., "Single-step synthesis of salans and substituted salans by Mannich condensation," Tetrahedron Letters, 2001, pp. 6405-6407, 42(36).
Carla J. Mathias, et al., "N,N'-bis(2-hydroxybenzyl)-1-(4-bromoacetamidobenzyl)-1,2-ethylene-diamine-N,N'-diacetic acid: a new bifunctional chelate for radio-labeling antibodies," Bioconjugate Chem., 1990, pp. 204-211, 1(3).
Andrew S. Craig, et al., "Towards tumor imaging with indium-111 labeled macrocycle-antibody conjugates," J. Chem. Soc., Chem. Commun., 1989, pp. 794-796, (12).
Jonathan P. L. Cox, et al., "Synthesis of a kinetically stable yttrium-90 labeled macrocycle-antibody conjugate," J. Chem. Soc. Chem. Commun., 1989, pp. 797-798, (12).
J. Richard Morphy, et al., "Towards tumor targeting with copper-radiolabeled macrocycle-antibody conjugates," J. Chem. Soc. Chem. Commun., 1989, pp. 792-794, (12).
J. Richard Morphy, et al., "Antibody labeling with functionalized cyclam. macrocycles," J.Chem. Soc. Chem. Commun., 1988, pp. 156-158, (3).
Arthur E. Martell, et al., "J. Synthesis of N,N'-di(2-hydroxybenzyl)ethylenediamine-N,N'-diacetic acid (HBED) and derivatives," Can. J. Chem., 1986, pp. 449-456, 64(3).
Peter Laverman, et al., "Optimized labeling of NOTA-conjugated octreotide with F-18," Tumour Biol., 2012, pp. 427-434, (2).
Andrew S. Craig, et al., "Stability, gallium-71 NMR and crystal structure of a neutral gallium(III) complex of 1,4,7-triazacyclononanetriacetate: a potential radiopharmaceutical?," J. Chem. Soc. Chem. Commun., 1989, pp. 1793-1794, (23).
Diana Utz, et al., "Syntheses and characterization of copper complexes with the ligand 2-aminoethyl(2-pyridylmethyl)-1,2-ethanediamine (apme)," J. Inorg. Biochem., 2008, pp. 1236-1245, 102(5-6).
Aysegul Efendioglu, et al., "Preconcentration of Cu(II), Cd(II) and Pb(II) on amberlite XAD-4 resin functionalized with N, N'-bis(o-vanillinidene)ethylenediamine and their determination by FAAS in water samples," Anal. Sci., 2010, pp. 1283-1288, 26(12).
Tao Zhou, et al., "Synthesis and Iron(III)-Chelating Properties of Novel 3-Hydroxypyridin-4-one Hexadentate Ligand-Containing Copolymers," Biomacromolecules, 2008, pp. 1372-1380, 9(5).
N. Nishat, et al., "Synthesis and characterization of trinuclear macrocyclic transition metal complexes," Synth. In React. Inorg. Met.-Org. Chem., 2001, pp. 1599-1610, 31(9).
B. Singh, et al., "Mono- and trinuclear metal complexes of a 12-membered tetraaza macrocycle: synthesis and characterization," Synth. React. Inorg. Met.-Org. Chem., 2000, pp. 897-907, 30(5).
B. Singh, et al., "V. L. Synthesis and characterization of mono and trinuclear lanthanide(III) complexes of 12-membered tetraaza macrocycle," Indian J. Chem., Sect. A: Inorg., Bio-inorg., Phys., Theor. Anal. Chem., Aug. 1999, pp. 802-807, 38A(8).
Fathi M.A.M. Agra, et al., "Transition metal complexes of a new 12-membered tetraaza macrocycle," Synth. React.Inorg. Met.-Org. Chem., 1994. pp. 1599-1612, 24(9).
David Parker, et al., "Implementation of macrocycle conjugated antibodies for tumor-targetting," Pure Appl. Chem., 1989, pp. 1637-1641, 61(9).
Fang Tian, et al., "Biomimetic design of chelating interfaces," J. Appl. Polym. Sci., 2015, pp. 41231/1-41231/8, 132 (1).
Andrew R. Vaino, et al., "Solid-Phase Organic Synthesis: A Critical Understanding of the Resin," J. Comb. Chem., Jun. 2000, pp. 579-596, 2(6).
Tai Tung Yip, et al., "Immobilized metal ion affinity chromatography," Methods Mol. Biol., Pract. Protein Chromatogr., 1992, pp. 17-31, 11(2).
Dirk Burdinski, et al., "Lanthanide Complexes of Triethylenetetramine Tetra-, Penta-, and Hexaacetamide Ligands as Paramagnetic Chemical Exchange-Dependent Saturation Transfer Contrast Agents for Magnetic Resonance Imaging: Nona-versus Decadentate Coordination." Inorg. Chem., 2009, pp. 6692-6712, 48(14).
Eric W. Price, et al., "H4octapa: An Acyclic Chelator for 111In Radiopharmaceuticals," J. Am. Chem. Soc., 2012, pp. 8670-8683, 134(20).
Edit Farkas, et al., "Equilibrium, Kinetic and Structural Properties of Gallium(III) and Some Divalent Metal Complexes Formed with the New DATAm and DATA5m Ligands," Chem. Eur. J., 2017, pp. 10358-10371, 23(43).
Ghassan Bechara, et al., "An efficient route to pyridine and 2,2'-bipyridine macrocycles incorporating a triethylenetetraminetetraacetic acid core as ligand for lanthanide ions," Tetrahedron Letters, 2009, pp. 6522-6525, 50(47).
Kazuya Takenouchi, et al., "Novel bifunctional macrocyclic chelating agents appended with a pendant-type carboxymethylamino ligand and nitrobenzyl group and stability of the 88YIII complexes," J. Org. Chem., 1993, pp. 1955-1958, 58(7).
Arthur E. Martell, et al., "N,N'-Bis(2-hydroxybenzyl)ethylenediamine-N,N'-diacetic acid (HBED)," Inorg. Synth., 1998, pp. 120-122, 32.
Matthias Eder, et al., "68Ga-Complex Lipophilicity and the Targeting Property of a Urea-Based PSMA Inhibitor for PET Imaging," Bioconjugate Chem., 2012, pp. 688-697, 23(4).
Matthias Eder, et al., "Tetrafluorophenolate of HBED-CC: a versatile conjugation agent for 68Ga-labeled small recombinant antibodies," Eur. J. Nucl. Med. Mol. Imaging, 2008, pp. 1878-1886, 35(10).
Aaron C. Sather, et al., "Selective recognition and extraction of the uranyl ion from aqueous solutions with a recyclable chelating resin," Chem. Sci., 2013, pp. 3601-3605, 4(9).
Alexander V. Pestove, et al., "Synthesis of chelating polymer sorbents by using the S NH methodology," J. Appl. Polym. Sci., 2012, pp. 1970-1978, 125(3).
Diego D. Diogo, et al., "The role of matrix porosity in the adsorption of Cu(II) by amidoxime chelating resins: An electron paramagnetic resonance study," 2011, pp. 721-727, 71(7).
Amanda N. Puslam, et al., "Engineering selectivity into polymer-supported reagents for transition metal ion complex formation," React. Funct. Polym., 2010, pp. 545-554, 70(8).
Aminul Islam, et al., Characterization of a novel chelating resin of enhanced hydrophilicity and its analytical utility for preconcentration of trace metal ions, 2010, pp. 1772-1780, 81(4-5).
A. Nilchi, et al., "Adsorption properties of amidoxime resins for separation of metal ions from aqueous systems," React. Funct. Polym., 2008, pp. 1665-1670, 68(12).
Dorota Kolodynska et al., "Comparison of chelating ion exchange resins in sorption of copper(II) and zinc(II) complexes with ethylenediaminetetraacetic acid (EDTA) and nitrilotriacetic acid (NTA)," Can. J. Chem., 2008, pp. 958-969, 86(10).
Sadhan Pramanik, et al., "Separation and determination of some metal ions on new chelating resins containing N, N donor sets," Anal. Chim. Acta, 2006, pp. 430-437, 556(2).
H. Kaur, et al., "Functionalization of XAD-4 resin for the separation of lanthanides using chelation ion exchange liquid chromatography," React. Funct. Polym., 2005, pp. 277-283, 65 (3).
Song Li et al., "Synthesis and Characterization of a Novel Chloromethylated Polystyrene-g-2-adenine Chelating Resin and its Application to Preconcentrate and Detect the Concentration of Mercury Ions in Edible Mushroom Samples," Canadian Journal of Chemistry, Jul. 6, 2016, pp. 751-758, vol. 94, No. 9.
Youning Chen et al., "A Novel Polyvinyltetrazole-Grafted Resin with High Capacity for Adsorption of Pb(II), Cu(II) and Cr(III) Ions From Aqueous Solutions," Journal of Materials Chemistry A, Apr. 16, 2014, pp. 10444-10453, vol. 2, No. 27.
Xuewen Tao et al., "Insight Into Selective Removal of Copper from High-Concentration Nickel Solutions with XPS and DFT: New Technique to Prepare 5N-Nickel with Chelating Resin," Journal of Environmental Sciences, Oct. 1, 2016, pp. 34-44, vol. 48.
Xiaosheng Jing et al., "Adsorption Performances and Mechanisms of the Newly Synthesized N, N'-di (Carboxymethyl) Dithiocarbam-

(56) References Cited

OTHER PUBLICATIONS ate Chelating Resin Toward Divalent Heavy Metal Ions from Aqueous Media," Journal of Hazardous Materials, Aug. 15, 2009, pp. 589-596, vol. 167, Nos. 1-3.
Hrishikesh S. Gupte et al., "Azo Resorcin[4]Calixpyrrole Grafted Amberlite XAD-2 Polymer: An Efficient Solid Phase Extractant for Separation and Preconcentration of La(111) and Ce(111) from Natural Geological Samples," Journal of Inclusion Phenomena and Macrocyclic Chemistry, Apr. 2015, pp. 409-422, vol. 81, Nos. 3-4.
Cheng Cheng et al., "Preparation of New Hyper Cross-Linked Chelating Resin for Adsorption of Cu2+ and Ni2+ from Water," Chinese Chemical Letters, Aug. 23, 2012, pp. 245-248, vol. 23, No. 2.
Changqing Zhu et al., "Enhanced Removal of Cu(II) and Ni(II) from Saline Solution by Novel Dual-Primary-Amine Chelating Resin Based on Anion-Synergism," Journal of Hazardous Materials, Apr. 28, 2015, pp. 234-242, vol. 287.
Zengdi Wang et al., "Heterogeneous Synthesis of Chelating Resin Organophosphonic Acid-Functionalized Silica Gel and its Adsorption Property of Heavy Metal Ions from Fuel Ethanol Solutions," Journal of Applied Polymer Science, Oct. 15, 2012, pp. 544-551, vol. 126, No. 2.
Fuqiang Liu et al., "Interaction Mechanism of Aqueous Heavy Metals onto a Newly Synthesized IDA-Chelating Resin: Isotherms, Thermodynamics and Kinetics," Chemical Engineering Journal, Sep. 2011, pp. 106-114, vol. 173, No. 1.
Akil Ahmad et al., "New Generation Amberlite XAD Resin for the Removal of Metal Ions: A Review," Journal of Environmental Sciences, May 1, 2015, pp. 104-123, vol. 31.
Aysegül Karakücük et al., "Polymer Supported Calix[4]arene Schiff Bases: A Novel Chelating Resin for Hg2+ and Dichromate Anions," Journal of Macromolecular Science, Part A: Pure and Applied Chemistry, Jun. 2005, pp. 691-704, vol. 42, No. 6.
Seher Şener et al., "Preconcentration/Separation of Some Trace Metal Ions from Water Samples by a New Synthesized Chelating Resin," Journal of AOAC International, Mar.-Apr. 2014, pp. 598-604, vol. 97, No. 2.
Liuqing Yang et al., "Preparation and Adsorption Performance of a Novel Bipolar PS-EDTA Resin in Aqueous Phase," Journal of Hazardous Materials, Aug. 15, 2010, pp. 98-105, vol. 180, Nos. 1-3.
Serkan Emik, "Preparation and Characterization of an IPN Type Chelating Resin Containing Amino and Carboxyl Groups for Removal of Cu(II) from Aqueous Solutions," Reactive & Functional Polymers, Feb. 2014, pp. 63-74, vol. 75, No. 1.
K.V.K. Reddy et al., "Preparation of a Chelating Resin by Immobilizing 3-((E)-(2-Amino Phenyl Imino) Methyl) Phenol on Amberlite XAD-16 and its Application of Solid Phase Extraction of Fe(II), Cu(II), Mn(II), and Zn(II) in Natural Water Samples," Research Journal of Pharmaceutical, Biological and Chemical Sciences (RJPBCS), Jul.-Sep. 2012, pp. 340-349, vol. 3, No. 3.
In-Hwan Park et al., "Preparation of Chelating Resins Containing a Pair of Neighboring Carboxylic Acid Groups and the Adsorption Characteristics for Heavy Metal Ions," Separation Science and Technology, Nov. 14, 2005, pp. 2963-2986, vol. 40, No. 14.
C. Flassbeck et al., "Synthesis of N-Phenolate-Functionalized Macrocycles of 1,4,7-Triazacyclononane and of 1-Oxa-4,7-Diazacyclononane and their Cordination Chemistry with Iron(III)," Journal of the Chemical Society, Dalton Transactions, Feb. 1992, pp. 60-68, vol. 608, No. 8.
A.L. Crumbliss et al., "Synthesis and Characterization of Iron(III) Chelating Analogues of Siderophores on Organic Solid Supports," Inorganica Chimica Acta, Oct. 15, 1987, pp. 281-287, vol. 133, No. 2.
Takayuki Matsushita et al., "Synthesis of Copper(II) Selective Chelating Resin Bearing a Tetraaza Macrocyclic Schiff Base Ligand," Chemistry Letters, Oct. 1988, pp. 1577-1580, vol. 17, No. 10.
S. Samal et al., "Synthesis and Metal Ion Uptake Studies of Chelating Resins Derived from Formaldehyde-Furfuraldehyde Condensed Phenolic Schiff Bases of 4,4'-Diaminodiphenylether and o-Hydroxyacetophenone," Talanta, Jul. 19, 2002, pp. 1075-1083, vol. 57, No. 6.
Brian P. Murphy et al., "Lanthanide Complexes of New Ditopic, Tripodal Macrocycles: Synthetic, Structural, Stability and Luminescence Studies," Inorganic Chemistry Communications, Aug. 2002, pp. 577-580, vol. 5, No. 8.
Lidan Zong et al., "A Novel Pyridine Based Polymer for Highly Efficient Separation of Nickel from High-Acidity and High-Concentration Cobalt Solutions," Chemical Engineering Journal, Feb. 15, 2018, pp. 995-1005, vol. 334.
Mojtaba Shamsipur et al., "A Stoichiometric Imprinted Chelating Resin for Selective Recognition of Copper(II) Ions in Aqueous Media," Analytica Chimica Acta, Sep. 19, 2007, pp. 294-301, vol. 599, No. 2.
F. Cleeren et al., "New Chelators for Low Temperature Al18F-Labeling of Biomolecules," Bioconjugate Chemistry, Feb. 2, 2016, pp. 790-798, vol. 27, No. 3.
Levi M. Bin et al., "Effectiveness of FeEDDHA, FeEDDHMA, and FeHBED in Preventing Iron-Deficiency Chlorosis in Soybean," Journal of Agricultural and Food Chemistry, Oct. 3, 2016, pp. 8273-8281, vol. 64, No. 44.
Koji Oshita et al., "Development of Chelating Resins and Their Ability of Collection and Separation for Metal Ions," Bunseki Kageku, May 2008, pp. 291-311, vol. 57, No. 5.
Felipe Yunta et al., "Chelating Agents Related to Ethylenediamine Bis(2-Hydroxyphenyl)acetic Acid (EDDHA): Synthesis, Characterization, and Equilibrium Studies of the Free Ligands and their Mg2+, Ca2+, Cu2+, and Fe3+ Chelates," Inorganic Chemistry, Jul. 30, 2003, pp. 5412-5421, vol. 42, No. 17.
Cheri A. Barta et al., "Molecular Architectures for Trimetallic d/f/d Complexes: Structural and Magnetic Properties of a LnNi2 Core," Inorganic Chemistry, Apr. 7, 2008, pp. 2280-2293, vol. 47, No. 7.
C. Allen Chang et al., "Synthesis, Characterization, and Crystal Structures of M(DO3A) (M=Fe, Gd) and Na[M(DOTA)] (M=Fe, Y, Gd)," Inorganic Chemistry, Aug. 4, 1993, pp. 3501-3508, vol. 32, No. 16.
Jonathan P. L. Cox et al., "Synthesis of C- and N-Functionalised Derivatives of 1,4,7-Triazacyclononane-1,4,7-Triyltriacetic acid (NOTA), 1,4,7,10-Tetra-Azacyclododecane-1,4,7,10-Tetrayltetra-Acetic Acid ( DOTA), and Diethylenenetriaminepenta-Acetic Acid (DTPA): Bifunctional Complexing Agents for the Derivatisation of Antibodies," Journal of the Chemical Society Perkin Transactions 1, Sep. 1990, pp. 2567-2576, vol. 9.
Thomas Clement Loomis, "Metal Chelates of Cyclohexenediaminetetraacetic Acid," Iowa State College, Retrospective Theses and Dissertations, 1953, 205 pages.
Paloma Nadal et al., "Evaluation of Fe—N, N'-Bis(2-Hydroxybenzyl)Ethylenediamine-N, N'-Diacetate (HBED/Fe3+) as Fe Carrier for Soybean (Glycine Max) Plants Grown in Calcareous Soil," Plant Soil, May 2, 2012, pp. 349-362, vol. 360, Nos. 1-2.
Teresa M. Jones-Wilson et al., "New Hydroxybenzyl and Hydroxypyridylmethyl Substituted Triazacyclononane Ligands for Use with Gallium(III) and Indium(III)," Nuclear Medicine and Biology, Oct. 1995, pp. 859-868, vol. 22, No. 7.
Niyazi Biçak et al., "Poly (Styrene Sulfonamides) with EDTA-Like Chelating Groups for Removal of Transition Metal Ions," Journal of Applied Polymer Science, Jul. 19, 2000, pp. 2749-2755, vol. 77, No. 12.
Krishnapillai Girish Kumar et al., "Polystyrene Anchored Vanillin Schiff Base-Complexation and Ion Removal Studies," Journal of Applied Polymer Science, Nov. 15, 2005, pp. 1536-1539, vol. 98, No. 4.
Elif V. Oral et al., "Preconcentration and Determination of Copper and Cadmium Ions with 1,6-Bis(2-Carboxy Aldehyde Phenoxy) Butane Functionalized Amberlite XAD-16 by Flame Atomic Absorption Spectrometry," Journal of Hazardous Materials, Feb. 15, 2011, pp. 724-730, vol. 186, No. 1.
Elizabeth M. Moyers et al., "Preparation and Analytical Applications of a Propylenediaminetetraacetic Acid Resin," Analytical Chemistry, Mar. 1977, pp. 418-423, vol. 49, No. 3.
Hiroaki Egawa et al., "Preparation of Macroreticular Chelating Resins Containing Dihydroxyphosphino and/or Phosphono Groups

(56) References Cited

OTHER PUBLICATIONS and Their Adsorption Ability for Uranium," Journal of Applied Polymer Science, Jun. 1984, pp. 2045-2055, vol. 29, No. 6.
Ö. Szabadka, "Studies on Chelating Resins-I: General Equation for the Calculation of the Protonation Constants of Chelating Resins," Talanta, Mar. 1982, pp. 177-181, vol. 29, No. 3.
Ö. Szabadka, "Studies on Chelating Resins-II: Determination of the Protonation Constants of a Chelating Resin Containing Iminodiacetic Acid Groups," Talanta, Mar. 1982, pp. 183-187, vol. 29, No. 3.
Berrin Topuz et al., "Solid Phase Extraction and Preconcentration of Cu(II), Pb(II), and Ni(II) in Environmental Samples on Chemically Modified Amberlite XAD-4 with a Proper Schiff Base," Environmental Monitoring and Assessment, Feb. 2011, pp. 709-722, vol. 173, Nos. 1-4.
Chunhua Xiong et al., "Synthesis, Characterization and Application of Triethylenetetramine Modified Polystyrene Resin in Removal of Mercury, Cadmium and Lead from Aqueous Solutions," Chemical Engineering Journal, Dec. 15, 2009, pp. 844-850, vol. 155, No. 3.

\* cited by examiner

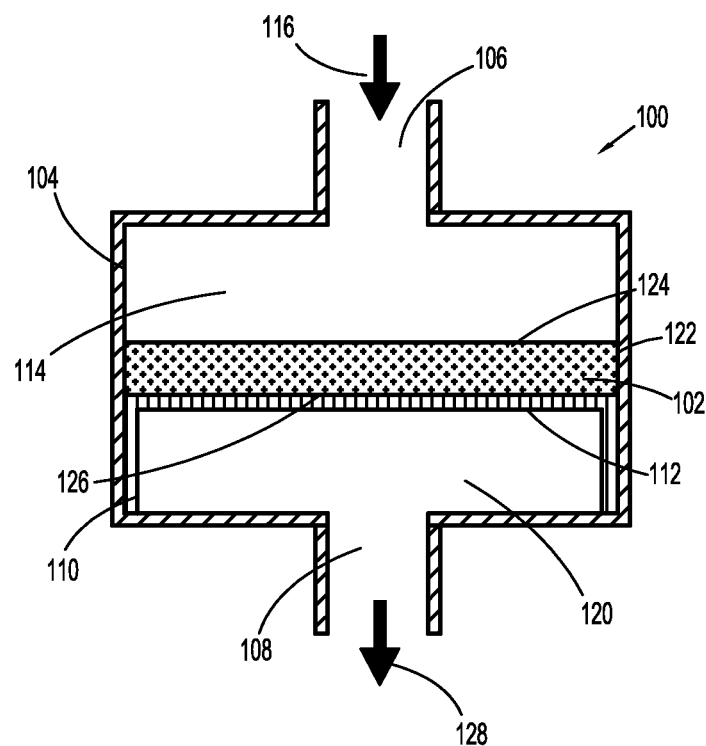

STRONG BINDING METAL-CHELATING RESINS

PRIORITY CLAIM

The present application claims priority to U.S. Provisional Patent Application Ser. No. 63/183,941, entitled "Strong Binding Metal-Chelating Resins," filed May 4, 2021, the content of which is incorporated by reference herein in its entirety.

BACKGROUND

Ultra-pure liquids free of metallic contamination are required for many industrial purposes such as, for example, the manufacture of integrated circuits in the microelectronics industry and of pharmaceutical products. For example, a composition containing many chemical substances is applied to the manufacture of a product used for electronic parts or semiconductor production such as in the manufacture of integrated circuits where many of the processing liquids come into contact with a bare silicon wafer or a resist coated surface. These processing liquids can include photoresists and treatment chemicals such as organic liquids and aqueous solutions which contain acids, bases, oxidants, reductants and other chemical agents. It is known that these solutions can be a source of contamination of the components of integrated circuits and may interfere with their performance. In the case of a resist film-forming composition or resist underlayer film-forming composition used in a lithographic process for semiconductor production, a trace amount of metal ions remaining in such a composition or a metal- or metal oxide-derived electrically charged colloidal substance contained in the composition may have an unexpected adverse effect on a final product, or on the lithographic process or etching process during production of the product. Thus, the reduction or removal of soluble metallic contaminants from processing fluids that are used in, for example, the production of integrated circuits reduces or prevents damage to the integrated circuits.

SUMMARY

In accordance with an illustrative embodiment, a metal-chelating resin is provided which comprises:

(a) a compound represented by Formula (I):

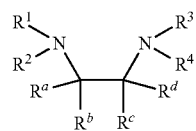

or a stereoisomeric form thereof or a salt thereof, wherein $R^1$, $R^2$, $R^3$, $R^4$, $R^a$, $R^b$, $R^c$, and $R^d$ are as defined herein; and (b) an organic polymer resin having at least one complementary reactive functional group covalently linked with at least one linking group of the compound represented by Formula (I).

In accordance with another illustrative embodiment, a process for removing one or more metallic components that are contained in an aqueous solution and/or a non-aqueous solution is provided, the process comprising the step of contacting an aqueous solution or a non-aqueous solution containing one or more metallic components with a metal-chelating resin comprising:

(a) a compound represented by Formula (I):

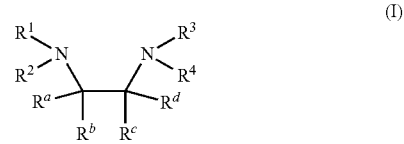

or a stereoisomeric form thereof or a salt thereof, wherein $R^1$, $R^2$, $R^3$, $R^4$, $R^a$, $R^b$, $R^c$, and $R^d$ are as defined herein; and (b) an organic polymer resin having at least one complementary reactive functional group covalently linked with at least one linking group of the compound represented by Formula (I) for a time sufficient to reduce the concentration of the one or more metallic components in the aqueous solution and/or the non-aqueous solution.

The metal-chelating resins disclosed herein are believed to be able to reduce the level of one or more metallic components such as divalent metals, trivalent metals or higher-valent metals to sub-parts-per-billion levels from reagents and mixtures used in any of the chemical and microelectronics industries. In addition, the metal-chelating resins disclosed herein are believed to be chemically stable when used in manufacturing environments. For example, the metal-chelating resins disclosed herein are believed to be stable towards acid (i.e., hydrolytic stability at low pH), stable towards base (i.e., hydrolytic stability at high pH), stable towards heat (i.e., thermal stability), stable towards oxygen (i.e., air) and oxidizing environments, stable towards reducing environments, and stable toward exposure to light (i.e., photostability). Finally, the used metal-chelating resins disclosed herein may be regenerated, recycled and reused.

BRIEF DESCRIPTION OF THE DRAWINGS

The disclosure may be more completely understood in consideration of the following description of various illustrative embodiments in connection with the accompanying drawings.

FIG. 1 is an illustration of an exemplary cross-section of a filter with a single porous membrane.

DETAILED DESCRIPTION

The illustrative embodiments described herein are directed to metal-chelating resins that contain immobilized "ultra chelates", that is, metal-chelates that possess very strong (i.e., high) binding constants ($K_f$) for removing desired metallic components such as divalent metals, trivalent metals or higher-valent metals from aqueous and non-aqueous solutions, which will be discussed hereinbelow. Metal-chelating resins are widely used in the chemical industry for a wide range of purposes. For example, metal chelating resins have been used to remove divalent, trivalent and higher-valent metals from reagents and mixtures used in the microelectronics industry. Presently, it is desired in the microelectronics industry that the level of, for example, iron (Fe) species in reagents and mixtures be reduced to sub-part-per-billion levels or sub-part-per-trillion levels (e.g., 100 down to 10 parts-per-trillion). In addition, future metal concentration levels may need to be further reduced to levels such as in the range of 10 down to 1 parts-per-trillion, or even lower yet in the sub-parts-per-trillion levels (i.e., parts-per-quadrillion level). Some processing reagents and mixtures are basic in nature or acidic in nature. Also, some processing reagents and mixtures contain quaternary ammonium hydroxides. Reducing levels of soluble metallic impurities is made even more difficult in the presence of hydroxide ions that strongly bind to the metal ions and interfere in their removal by use of present methods known to those skilled in the art (e.g., filtration, ion exchange resins, chelating agents and chelating resins).

Thus, reducing levels of soluble divalent, trivalent and higher-valent metal ions and related chemical species to such acceptably low levels is a challenging task. Present metal-chelating resins in use do not possess a binding constant sufficient to bind metals in order to reduce the concentration of the metals to a desired level. A list of common metal chelating agents is shown below in Table 1.

these levels from any aqueous solution, non-aqueous solution or mixtures thereof containing such metals. Accordingly, the term "aqueous solution, non-aqueous solution or mixtures thereof" as used herein is intended to be broadly construed, so as to encompass, for example, organic salt solutions (e.g., quaternary ammonium and phosphonium compounds), quaternary hydroxides, brine, buffer solutions, biochemical/biomedical solutions, bodily fluids, drinking water, waste water, industrial effluent streams, chemical waste, mining and metal working fluids, organic amines, organic halides, organic solvents, surfactant solutions, chemical formulations, processing fluids, drilling fluids, hydraulic fracturing fluids, and well stimulation fluids.

In an illustrative example, the metal-chelating resins disclosed herein can be used for removing metals such as $Fe^{2+}$ and $Fe^{3+}$ to the foregoing levels from solutions comprising amines and amino alcohols. Aqueous amines are employed in the fabrication of semiconductors. For example, hydroxylamine is often a component in photoresist

TABLE 1

| Chelating Functional group | Trade name examples | $K_f$ of chelate with metal ions | | | | | |
|---|---|---|---|---|---|---|---|
| | | $Mg^{2+}$ | $Ni^{2+}$ | $Cu^{2+}$ | $Zn^{2+}$ | $Al^{3+}$ | $Fe^{3+}$ |
| Carboxylate ($COO^{1-}$) | WK40L, Lewatit ® S 8528 | $10^{0.55}$ | $10^{0.84}$ | $10^{1.82}$ | $10^{1.20}$ | $10^{1.61}$ | $10^{3.05}$ |
| Iminodi acetate ($IDA^{2-}$) | Lewatit ® MonoPlus TP 207, DIAION ™ CR11, Chelex ® 100, Chelex ® 20 | $10^{3.0}$ | $10^{8.3}$ | $10^{10.6}$ | $10^{7.2}$ | $10^{8.1}$ | $10^{10.8}$ |
| Amino methyl phosphonate ($AMPA^{2-}$) | | $10^{2.0}$ | $10^{5.3}$ | $10^{8.1}$ | $10^{5.3}$ | — | $10^{10.4}$ |
| Iminodimethylenephosphonate ($IDMPA^{4-}$) | Lewatit ® MonoPlus TP 260, Puromet ™ MTS9500 | — | — | $10^{12.7}$ | — | — | $10^{13.3}$ |

$K_f$ values are for metal chelates of fully deprotonated chelates.

Accordingly, there remains a need for improved metal-chelating resins that can significantly reduce the level of one or more metallic components such as divalent, trivalent and higher-valent metal ions to very low levels from, for example, acidic and basic reagents and mixtures that are used in industrial processes including the microelectronics industry. The metal-chelating resins disclosed herein solve the foregoing problems and are believed to be able to remove one or more metals such as divalent metals, trivalent metals and higher-valent metals from aqueous and non-aqueous solutions used in any of the chemical and microelectronics industries, for example, solutions of quaternary ammonium salts, to levels such as in the sub-parts-per-billion levels and sub-parts-per-trillion levels, e.g., range of 10 down to 1 parts-per-trillion, and even lower yet in the sub-parts-per-trillion levels.

In addition, the metal-chelating resins disclosed herein are believed to be chemically stable when used in manufacturing environments. For example, the metal-chelating resins disclosed herein are believed to be stable towards acid (i.e., hydrolytic stability at low pH), stable towards base (i.e., hydrolytic stability at high pH), stable towards heat (i.e., thermal stability), stable towards oxygen (i.e., air) and oxidizing environments, stable towards reducing environments, and stable toward exposure to light (i.e., photostability). Finally, it is useful but not required that the used metal-chelating resins disclosed herein may be regenerated, recycled and reused.

Moreover, it is contemplated that the metal-chelating resins disclosed herein can be used for removing metals to strippers, which remove photoresist after lithography. Reduction of metallic ion contaminants across the semiconductor supply chain is of increasing importance towards the effort to reduce defects and improve yield. Metallic ion reduction is critical for materials that come in direct contact with the wafer surface such as hydroxylamine, hydrazine and ammonium hydroxide.

In non-limiting illustrative embodiments, a metal-chelating resin comprises (a) a compound represented by Formula (I):

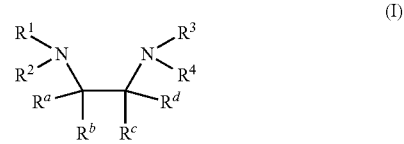

(I)

or a stereoisomeric form thereof or a salt thereof, wherein $R^1$, $R^2$, $R^3$ and $R^4$ are independently a protonated or deprotonated, substituted or unsubstituted 2-hydroxybenzyl moiety optionally containing a linking group for covalently linking the compound of Formula (I) to an organic polymer resin, a protonated or deprotonated, substituted or unsubstituted carboxyalkyl-containing moiety, wherein the alkyl group is a substituted or unsubstituted methylene group or a substituted or unsubstituted ethylene group optionally containing a linking group for covalently linking the compound of Formula (I) to an organic polymer resin, a protonated or deprotonated, substituted or unsubstituted phosphonoalkyl-containing moiety, wherein the alkyl group is a substituted or unsubstituted methylene group or a substituted or unsubstituted ethylene group optionally containing a linking group for covalently linking the compound of Formula (I) to an organic polymer resin, or a protonated or deprotonated, substituted or unsubstituted hydroxyalkyl-containing moiety, wherein the alkyl group is a substituted or unsubstituted ethylene group or a substituted or unsubstituted propylene group optionally containing a linking group for covalently linking the compound of Formula (I) to an organic polymer resin;

$R^a$, $R^b$, $R^c$ and $R^d$ are independently hydrogen, a substituted or unsubstituted hydrocarbyl group of from 1 to about 18 carbon atoms, a halogen (e.g., F, Cl, Br, and I), a polar functional group, a linking group for covalently linking the compound of Formula (I) to an organic polymer resin, or wherein one of adjacent $R^a$ and $R^c$ or $R^a$ and $R^d$ or $R^b$ and $R^c$ or $R^b$ and $R^d$ are joined together to form a cis- or trans-cyclopentane moiety or a cis- or trans-cyclohexane moiety;

wherein at least one linking group for covalently linking the compound of Formula (I) to an organic polymer resin occurs in the compound; and (b) an organic polymer resin having at least one complementary reactive functional group covalently linked with at least one linking group of the compound represented by Formula (I).

Suitable polar functional group include, for example, $SO_3H$, $SO_3^-$, $CO_2H$, $CO_2^-$, carboxyethyl, carboxymethyl, phosphonomethyl, phosphonoethyl, hydroxyethyl, hydroxypropyl, $CF_3$, $NO_2$, OH, CN. As one skilled in the art will readily appreciate, a polar functional group as used herein is a group to assist in modifying the hydrophilicity characteristics for certain applications such as, for example, biomedical applications, or better facilitate the synthesis of linking the linking group to the organic polymer resin.

The term "substituted" as used herein may be the same or different substituent and includes, for example, hydrogen, halogens (e.g., fluorine), substituted or unsubstituted alkyl groups, substituted or unsubstituted alkoxy groups, substituted or unsubstituted alkenyl groups, substituted or unsubstituted alkynyl groups, substituted or unsubstituted aryl groups, substituted or unsubstituted arylalkyl groups, substituted or unsubstituted cycloalkyl groups, substituted or unsubstituted cycloalkenyl groups, substituted or unsubstituted aryl groups, substituted or unsubstituted heteroaryl groups, substituted heterocyclylalkyl groups, substituted or unsubstituted heteroarylalkyl groups, substituted or unsubstituted heterocyclic ring groups, amide-containing groups, carboxylic acid-containing groups, carbonyl-containing groups, ester-containing groups, ether-containing groups, ketone-containing groups and the like.

Suitable hydrocarbyl groups include, by way of example, a substituted or unsubstituted, straight or branched $C_1$ to $C_{18}$ alkyl group, a substituted or unsubstituted $C_3$ to $C_{18}$ cycloalkyl group, a substituted or unsubstituted $C_3$ to $C_{18}$ cycloalkylalkyl group, a substituted or unsubstituted $C_3$ to $C_{18}$ cycloalkenyl group, a substituted or unsubstituted $C_6$ to $C_{18}$ aryl group, or a substituted or unsubstituted $C_6$ to $C_{18}$ arylalkyl group.

Representative examples of alkyl groups for use herein include, by way of example, a straight or branched hydrocarbon chain radical containing carbon and hydrogen atoms of from 1 to about 18 carbon atoms, e.g., methyl, ethyl, n-propyl, 1-methylethyl (isopropyl), n-butyl, n-pentyl, etc., and the like. In an embodiment, examples of alkyl groups for use herein include a straight or branched hydrocarbon chain radical containing carbon and hydrogen atoms of from 1 to about 12 carbon atoms. In an embodiment, examples of alkyl groups for use herein include a straight or branched hydrocarbon chain radical containing carbon and hydrogen atoms of from 1 to about 9 carbon atoms. In an embodiment, examples of alkyl groups for use herein include a straight hydrocarbon chain radical containing carbon and hydrogen atoms of from 1 to 6 carbon atoms.

Representative examples of cycloalkyl groups for use herein include, by way of example, a substituted or unsubstituted non-aromatic mono or multicyclic ring system of about 3 to about 18 carbon atoms or about 3 to about 12 carbon atoms such as, for example, cyclopropyl, cyclobutyl, cyclopentyl, cyclohexyl, bridged cyclic groups or spirobicyclic groups and the like, optionally containing one or more heteroatoms, e.g., O and N, and the like.

Representative examples of cycloalkenyl groups for use herein include, by way of example, a substituted or unsubstituted cyclic ring-containing radical containing from about 3 to about 18 carbon atoms or about 3 to about 12 carbon atoms with at least one carbon-carbon double bond such as, for example, cyclopropenyl, cyclobutenyl, cyclopentenyl and the like, wherein the cyclic ring can optionally contain one or more heteroatoms, e.g., O and N, and the like.

Representative examples of cycloalkylalkyl groups for use herein include, by way of example, a substituted or unsubstituted cyclic ring-containing radical containing from about 3 to about 18 carbon atoms or about 3 to about 12 carbon atoms directly attached to the alkyl group which are then attached to the main structure at any carbon from the alkyl group that results in the creation of a stable structure such as, for example, cyclopropylmethyl, cyclobutylethyl, cyclopentylethyl and the like, wherein the cyclic ring can optionally contain one or more heteroatoms, e.g., O and N, and the like.

Representative examples of aryl groups for use herein include, by way of example, a substituted or unsubstituted monoaromatic or polyaromatic radical containing from about 6 to about 30 carbon atoms or about 5 to about 12 carbon atoms such as, for example, phenyl, naphthyl, tetrahydronaphthyl, indenyl, biphenyl and the like, optionally containing one or more heteroatoms, e.g., O and N, and the like.

Representative examples of arylalkyl groups for use herein include, by way of example, a substituted or unsubstituted aryl group as defined above directly bonded to an alkyl group as defined herein, e.g., $—CH_2C_6H_5$, $—C_2H_4C_6H_5$ and the like, wherein the aryl group can optionally contain one or more heteroatoms, e.g., O and N, and the like.

In an embodiment, $R^a$, $R^b$, $R^c$ and $R^d$ are independently hydrogen, a substituted or unsubstituted $C_1$ to $C_{18}$ alkyl moiety, a linear or branched, substituted or unsubstituted $C_1$ to $C_{18}$ hydroxyalkyl moiety, a linear or branched substituted or unsubstituted $C_1$ to $C_{18}$ alkyl moiety containing one or more stable ether linkages, a substituted or unsubstituted aryl moiety, or a substituted or unsubstituted alkyl aryl moiety.

In an illustrative embodiment, the compound of Formula (I) includes at least one pair of adjacent $R_a$ and $R^c$ or $R^a$ and $R^d$ or $R^b$ and $R^c$ or $R^b$ and $R^d$ which is joined together to form either a trans-cyclopentane moiety or a trans-cyclohexane moiety.

In an illustrative embodiment, $R^1$, $R^2$, $R^3$ and $R^4$ include at least one protonated or deprotonated, substituted or unsubstituted 2-hydroxybenzyl moiety optionally containing a linking group for covalently linking the compound of Formula (I) to an organic polymer resin.

In an illustrative embodiment, $R^1$, $R^2$, $R^3$ and $R^4$ include at least two protonated or deprotonated, substituted or unsubstituted 2-hydroxybenzyl moieties optionally containing a linking group for covalently linking the compound of Formula (I) to an organic polymer resin.

In an illustrative embodiment, at least one but no more than two linking groups are present in the compound of Formula (I). In an illustrative embodiment, two or more linking groups are present in the compound of Formula (I).

In an illustrative embodiment, a protonated or deprotonated, substituted or unsubstituted 2-hydroxybenzyl moiety can include, for example, a moiety represented by the structure of Formula (II) or a moiety represented by the structure of Formula (III):

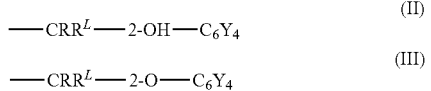

wherein R is independently hydrogen, a linear or branched $C_1$ to $C_4$ alkyl moiety, a linear or branched $C_1$ to $C_4$ hydroxyalkyl or a linear or branched $C_1$ to $C_4$ alkyl moiety containing one or more ether linkages. In an embodiment, R is hydrogen. In another embodiment, R is methyl. In an embodiment, $R^L$ is a linking group for covalently linking the compound of Formula (I) to the organic polymer resin. In general, $R^L$ can be any linking group capable of covalently linking the compound of Formula (I) with one or more complementary reactive functional groups of an organic polymer resin. In an illustrative embodiment, $R^L$ is of the formula $-(CRR)_x-(C_6Y_4)_y-(CRR)_z-NHR^5$ where x is 0 to 4, y is 0 or 1, z is 1 to 4, $R^5$ is independently hydrogen, methyl or ethyl, R has the aforestated meanings and Y is independently hydrogen, $R^L$, a halogen (e.g., F, Cl, and Br), $SO_3H$, $SO_3^-$, $CO_2H$, $CO_2^-$, $CF_3$, $NO_2$, CN, $C_6H_5$, $CH_2C_6H_5$, a linear or branched $C_1$ to $C_4$ alkyl moiety, and a linear or branched $C_1$ to $C_4$ fluoroalkyl moiety. In another embodiment, $R^L$ is a group represented by the formula $-(CRR)_x-(CRR)_z-NHR^5$ where x, z, R and $R^5$ have the aforestated meanings. In an embodiment, $R^L$ is a group represented by the formula $-(CH_2)_x-NH_2$ where x is from 2 to 6.

In another illustrative embodiment, $R^L$ is of the formula $-(CRR)_x-(C_6Y_4)_y-(CRR)_z-NR^6_2$ where x, y, z, R, and Y have the aforestated meanings and $R^6$ is 2-hydroxyethyl. In an illustrative embodiment, $R^L$ is of the formula $-(CRR)_x-(C_6Y_4)-X$ where x, y, Y and R have the aforestated meanings, and X is Cl, Br or I. In another illustrative embodiment, $R^L$ is of the formula $-(CRR)_x-(C_6Y_4)-(CRR)_z-CR^7=CR^8R^9$ wherein x, y, z, Y and R have the aforestated meanings, and $R^7$, $R^8$ and $R^9$ are independently hydrogen or a group with $C_1$ to $C_4$ carbon atoms. In another illustrative embodiment, $R^L$ is of the formula $-(CRR)_x-(C_6Y_4)-(CRR)_z-R^{10}$ wherein x, y, z, Y and R have the aforestated meanings, and $R^{10}$ is an epoxide derivative of the olefinic linking group $-(CRR)_x-(C_6Y_4)_y-(CRR)_z-CR^7=CR^8R^9$. In an embodiment, at least one but no more than two $R^L$ moieties occur in the compound of Formula (I).

In an illustrative embodiment, a protonated or deprotonated, substituted or unsubstituted carboxymethyl moiety can include, for example, a moiety represented by the structure of Formula (IV) or a moiety represented by the structure of Formula (V):

wherein R and $R^L$ have the aforestated meanings.

In an illustrative embodiment, a protonated or deprotonated, substituted or unsubstituted 2-carboxyethyl moiety can include, for example, a moiety represented by the structure of Formula (VI) or a moiety represented by the structure of Formula (VII):

wherein R and $R^L$ have the aforestated meanings.

In an illustrative embodiment, a protonated or deprotonated, substituted or unsubstituted phosphonomethyl moiety can include, for example, a moiety represented by the structure of Formula (VIII) or a moiety represented by the structure of Formula (IX) or a moiety represented by the structure of Formula (X):

wherein R and $R^L$ have the aforestated meanings.

In an illustrative embodiment, a protonated or deprotonated, substituted or unsubstituted 2-phosphonoethyl moiety can include, for example, a moiety represented by the structure of Formula (XI) or a moiety represented by the structure of Formula (XII) or a moiety represented by the structure of Formula (XIII):

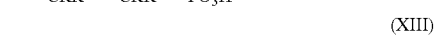

wherein R and $R^L$ have the aforestated meanings.

In an illustrative embodiment, a protonated or deprotonated, substituted or unsubstituted 2-hydroxyethyl moiety can include, for example, a moiety represented by the structure of Formula (XIV) or a moiety represented by the structure of Formula (XV):

(XIV)

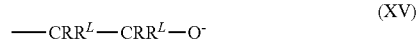
(XV)

wherein R and $R^L$ have the aforestated meanings.

In an illustrative embodiment, a protonated or deprotonated, substituted or unsubstituted 3-hydroxypropyl moiety can include, for example, a moiety represented by the structure of Formula (XVI) or a moiety represented by the structure of Formula (XVII):

(XVI)

(XVIII)

wherein R and $R^L$ have the aforestated meanings.

In an illustrative embodiment, one of $R^1$ and $R^2$, and one of $R^3$ and $R^4$ are a protonated or deprotonated, substituted or unsubstituted 2-hydroxybenzyl moiety; the other one of $R^1$ and $R^2$, and the other one of $R^3$ and $R^4$ are a protonated or deprotonated, substituted or unsubstituted carboxyalkyl-containing moiety, wherein the alkyl group is a substituted or unsubstituted methylene group or a substituted or unsubstituted ethylene group; and one of $R^a$, $R^b$, $R^c$ and $R^d$ is a linking group for covalently linking the compound of Formula (I) to an organic polymer resin.

In an illustrative embodiment, one of $R^1$ and $R^2$, and one of $R^3$ and $R^4$ are a protonated or deprotonated, substituted or unsubstituted 2-hydroxybenzyl moiety; the other one of $R^1$ and $R^2$, and the other one of $R^3$ and $R^4$ are a protonated or deprotonated, substituted or unsubstituted carboxyalkyl-containing moiety, wherein the alkyl group is a substituted or unsubstituted methylene group or a substituted or unsubstituted ethylene group; one of $R^a$ and $R^b$ is a linking group for covalently linking the compound of Formula (I) to an organic polymer resin, and the other one of $R^a$ and $R^b$ and each of $R^c$ and $R^d$ are hydrogen.

In an illustrative embodiment, one of $R^1$ and $R^2$, and one of $R^3$ and $R^4$ are a protonated or deprotonated, substituted or unsubstituted 2-hydroxybenzyl moiety; the other one of $R^1$ and $R^2$, and the other one of $R^3$ and $R^4$ are a protonated or deprotonated, substituted or unsubstituted carboxyalkyl-containing moiety, wherein the alkyl group is a substituted or unsubstituted methylene group or a substituted or unsubstituted ethylene group; one of $R^a$ and $R^b$ is a linking group selected from the group consisting of —(CRR)$_x$—(CRR)$_z$—NHR$^5$, —(CRR)$_x$—(C$_6$Y$_4$)$_y$—(CRR)$_z$—NR$^6{}_2$, —(CRR)$_x$—(C$_6$Y$_4$)$_y$—X, —(CRR)$_x$—(C$_6$Y$_4$)$_y$—(CRR)$_z$—CR$^7$=CR$^8$R$^9$, —(CRR)$_x$—(C$_6$Y$_4$)$_y$—(CRR)$_z$—R$^{10}$ where x, y, z, R, Y, R$^5$, R$^6$, R$^7$, R$^8$, R$^9$ and R$^{10}$ have the aforestated meanings or a linking group of the formula —(CH$_2$)$_x$—NH$_2$ where x is from 2 to 6, and the other one of $R^a$ and $R^b$ and each of $R^c$ and $R^d$ are hydrogen.

As one skilled in the art can readily appreciate, the at least one linking group can be the same or different linking group and can be any linking group capable of covalently linking the compound of Formula (I) with one or more complementary reactive functional groups of an organic polymer resin.

In an illustrative embodiment, a linking group $R^L$ can be a group represented by the formula —(CRR)$_x$—(C$_6$Y$_4$)—(CRR)$_z$—NHR$^5$ where x, y, z, R, Y and R$^5$ have the aforestated meanings. In an illustrative embodiment, a linking group $R^L$ can be a group represented by the formula —(CH$_2$)$_x$—NH$_2$ where x is from 2 to 6.

In an illustrative embodiment, a linking group $R^L$ can be a group represented by the formula —(CRR)$_x$—(C$_6$Y$_4$)$_y$—(CRR)$_z$—NR$^5$R$^6$ where R is independently hydrogen, a substituted or unsubstituted hydrocarbyl group as defined herein such as a linear or branched, substituted or unsubstituted $C_1$ to $C_{18}$ alkyl moiety, a linear or branched, substituted or unsubstituted $C_1$ to $C_{18}$ hydroxyalkyl moiety, or a linear or branched substituted or unsubstituted $C_1$ to $C_{18}$ alkyl moiety containing one or more stable ether linkages, x is 0 to 4, y is 0 or 1, z is 1 to 4, R$^5$ and R$^6$ are independently hydrogen, methyl, ethyl, hydroxyethyl or hydroxypropyl, or R$^5$ and R$^6$ together with the nitrogen atom they are bonded to can be joined together to form a ring structure, e.g., a phthalimide, and Y is independently a halogen (e.g., F, Cl, Br, I), a functional group chosen from SO$_3$H, SO$_3{}^-$, CO$_2$H, CO$_2{}^-$, carboxyethyl, carboxymethyl, hydroxyethyl, hydroxypropyl, CF$_3$, NO$_2$, OH, CN, C$_6$H$_5$, CH$_2$C$_6$H$_5$, a linear or branched, substituted or unsubstituted $C_1$ to $C_{18}$ alkyl moiety or a $C_1$ to $C_4$ alkyl moiety, and a linear or branched $C_1$ to $C_{18}$ fluoroalkyl moiety or a $C_1$ to $C_4$ fluoroalkyl moiety.

In an illustrative embodiment, a linking group $R^L$ can be a group represented by the formula —(CRR)$_x$—(C$_6$Y$_4$)$_y$—(CRR)$_z$—NR$^6{}_2$ where x, y, z, R, and Y have the aforestated meanings, and R$^6$ is 2-hydroxyethyl.

In an illustrative embodiment, a linking group $R^L$ can be a group represented by the formula —(CRR)$_x$—(C$_6$Y$_4$)$_y$—X where x, y, Y and R have the aforestated meanings, and X is Br or I.

In another illustrative embodiment, a linking group $R^L$ can be a group represented by the formula —(CRR)$_x$—(C$_6$Y$_4$)$_y$—(CRR)$_z$—CR$^7$=CR$^8$R$^9$ wherein x, y, z, Y and R have the aforestated meanings, and R$^7$, R$^8$ and R$^9$ are independently hydrogen or a group with $C_1$ to $C_4$ carbon atoms.

In another illustrative embodiment, a linking group $R^L$ can be a group represented by the formula —(CRR)$_x$—(C$_6$Y$_4$)$_y$—(CRR)$_z$—R$^{10}$ wherein x, y, z, Y and R have the aforestated meanings, and R$^{10}$ is an epoxide derivative of the olefinic linking group —(CRR)$_x$—(C$_6$Y$_4$)$_y$—(CRR)$_z$—CR$^7$=CR$^8$R$^9$.

One skilled in the art will readily understand that the linking groups disclosed herein can be in various protonated states as illustrated below.

In a non-limiting illustrative embodiment, a compound of Formula (I) is represented by the structure of Formula (Ia):

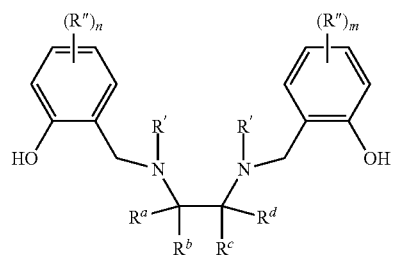

wherein:
R' is independently a protonated or deprotonated, substituted or unsubstituted carboxyalkyl-containing moiety, wherein the alkyl group is a substituted or unsubstituted methylene group or a substituted or unsubstituted ethylene group optionally containing a linking group for covalently linking the compound of Formula (Ia) to an organic polymer resin, a protonated or deprotonated, substituted or unsubstituted phosphonoalkyl-containing moiety, wherein the alkyl group is a substituted or unsubstituted methylene group or a substituted or unsubstituted ethylene group optionally containing a linking group for covalently linking the compound of Formula (Ia) to an organic polymer resin, or a protonated or deprotonated, substituted or unsubstituted hydroxyalkyl-containing moiety, wherein the alkyl group is a substituted or unsubstituted ethylene group or a substituted or unsubstituted propylene group optionally containing a linking group for covalently linking the compound of Formula (Ia) to an organic polymer resin;

m and n are independently integers from 1 to 4; and R" is independently hydrogen or a linking group for covalently linking the compound of Formula (Ia);

$R^a$, $R^b$, $R^c$ and $R^d$ are independently hydrogen or a linking group for covalently linking the compound of Formula (Ia).

In an illustrative embodiment, R' is a protonated or deprotonated carboxyethyl-containing moiety; R" is hydrogen, and one of $R^a$, $R^b$, $R^c$ and $R^d$ is a linking group and the other of $R^a$, $R^b$, $R^c$ and $R^d$ are each hydrogen; and the linking group is of the formula —$(CH_2)_x$—$NH_2$ where x is from 2 to 6.

In an illustrative embodiment, R' is a protonated or deprotonated hydroxyalkyl-containing moiety, wherein the alkyl group is a substituted or unsubstituted ethylene group or a substituted or unsubstituted propylene group; R" is hydrogen, and one of $R^a$, $R^b$, $R^c$ and $R^d$ is a linking group and the other of $R^a$, $R^b$, $R^c$ and $R^d$ are each hydrogen; and the linking group is of the formula —$(CH_2)_x$—$NH_2$ where x is from 2 to 6.

In an illustrative embodiment, R' is a protonated or deprotonated phosphonoalkyl-containing moiety, wherein the alkyl group is a substituted or unsubstituted methylene group or a substituted or unsubstituted ethylene group; R" is hydrogen, and one of $R^a$, $R^b$, $R^c$ and $R^d$ is a linking group and the other of $R^a$, $R^b$, $R^c$ and $R^d$ are each hydrogen; and the linking group is of the formula —$(CH_2)_x$—$NH_2$ where x is from 2 to 6.

In an embodiment, representative examples of a compound of Formula (I) include the following:

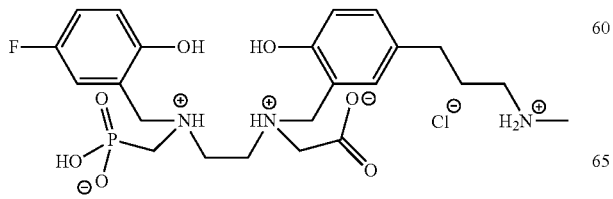

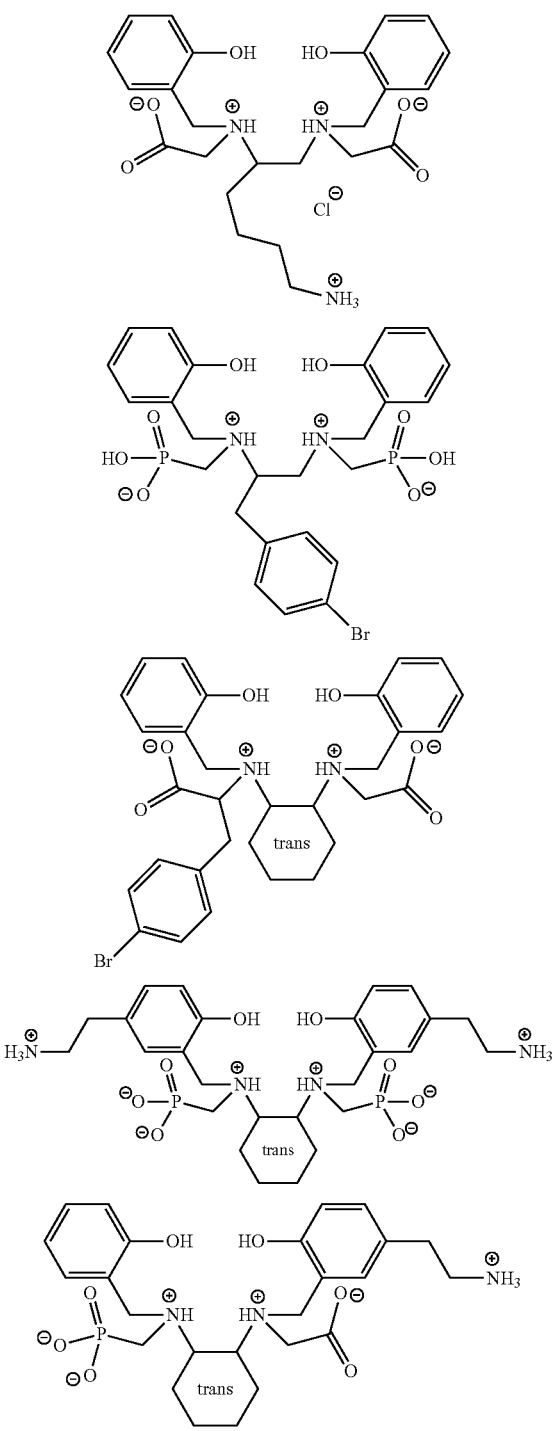

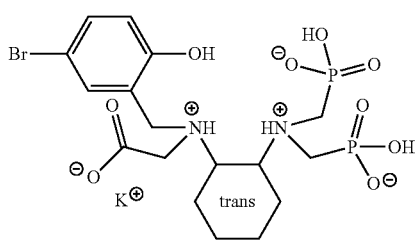

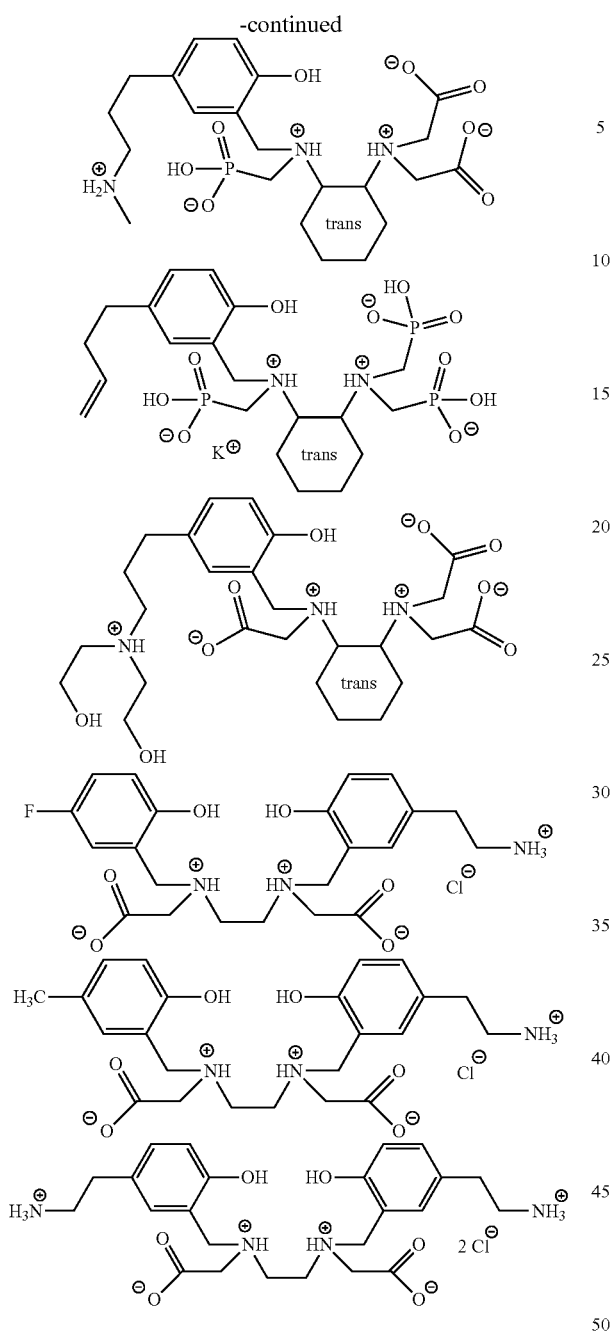

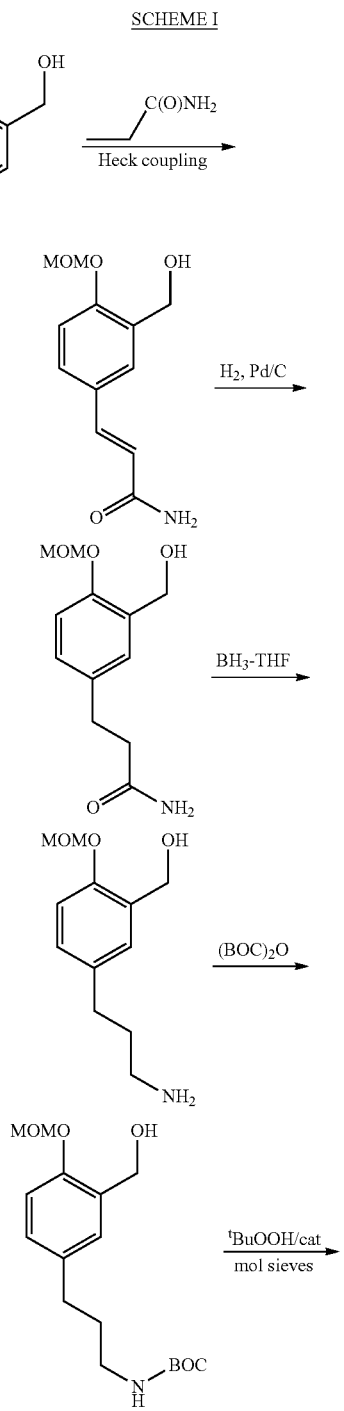

resins disclosed herein are presented by way of example only, and should not be construed as limiting in any way. In addition, the following schemes illustrate certain protecting groups for the benzyl group and linking arm. These protecting groups are merely illustrative and should not be construed as limiting in any way. Any suitable protecting group is contemplated and can be used herein.

In an illustrative embodiment, a compound represented by Formula (I) can be prepared as generally set forth below in Scheme I.

In general, the compounds represented by Formula (I) can be prepared by methods known in the art, see, for example, Schuhmacker et al., "A Bifunctional HBED-Derivative for Labeling of Antibodies with Ga, In and Fe, Comparative Biodistribution with In-DPTA and I-Labeled Antibodies in Mice Bearing Antibody Internalizing and Non-internalizing Tumors", International Journal of Radiation Applications and Instrumentation. Part B. Nuclear Medicine and Biology, Vol. 19, Issue 8, pp. 809-815 (November 1992), and Cleeren et al., Bioconjugate Chem., 27, pp. 790-798 (2016), the contents of each of which are incorporated by reference herein.

For example, in an illustrative embodiment, compounds represented by Formula (I) can be prepared as generally set forth below in the following schemes. It is to be appreciated that these and other schemes for obtaining the metal chelator 15
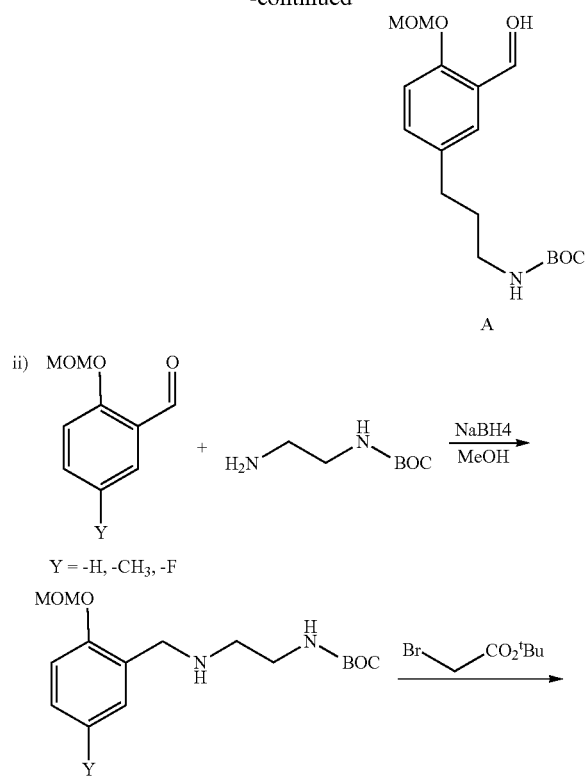
16
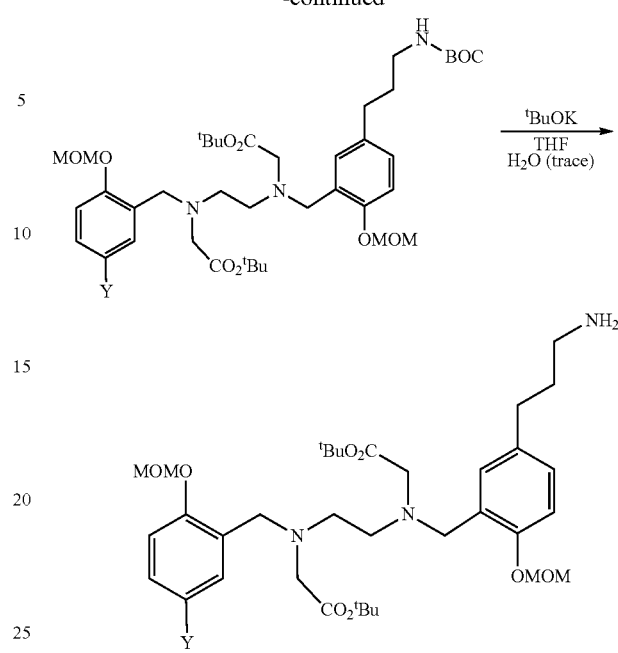
In another illustrative embodiment, compounds represented by Formula (I) can be prepared as generally set forth below in Scheme II.
SCHEME II
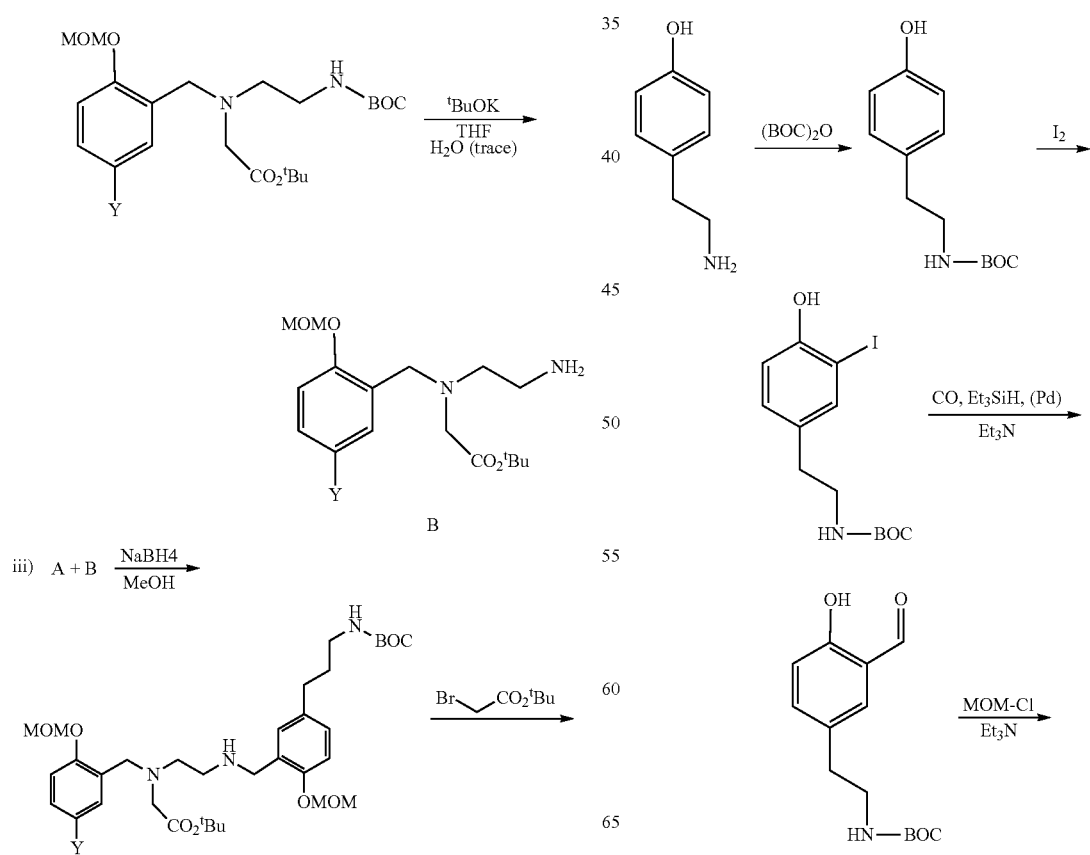

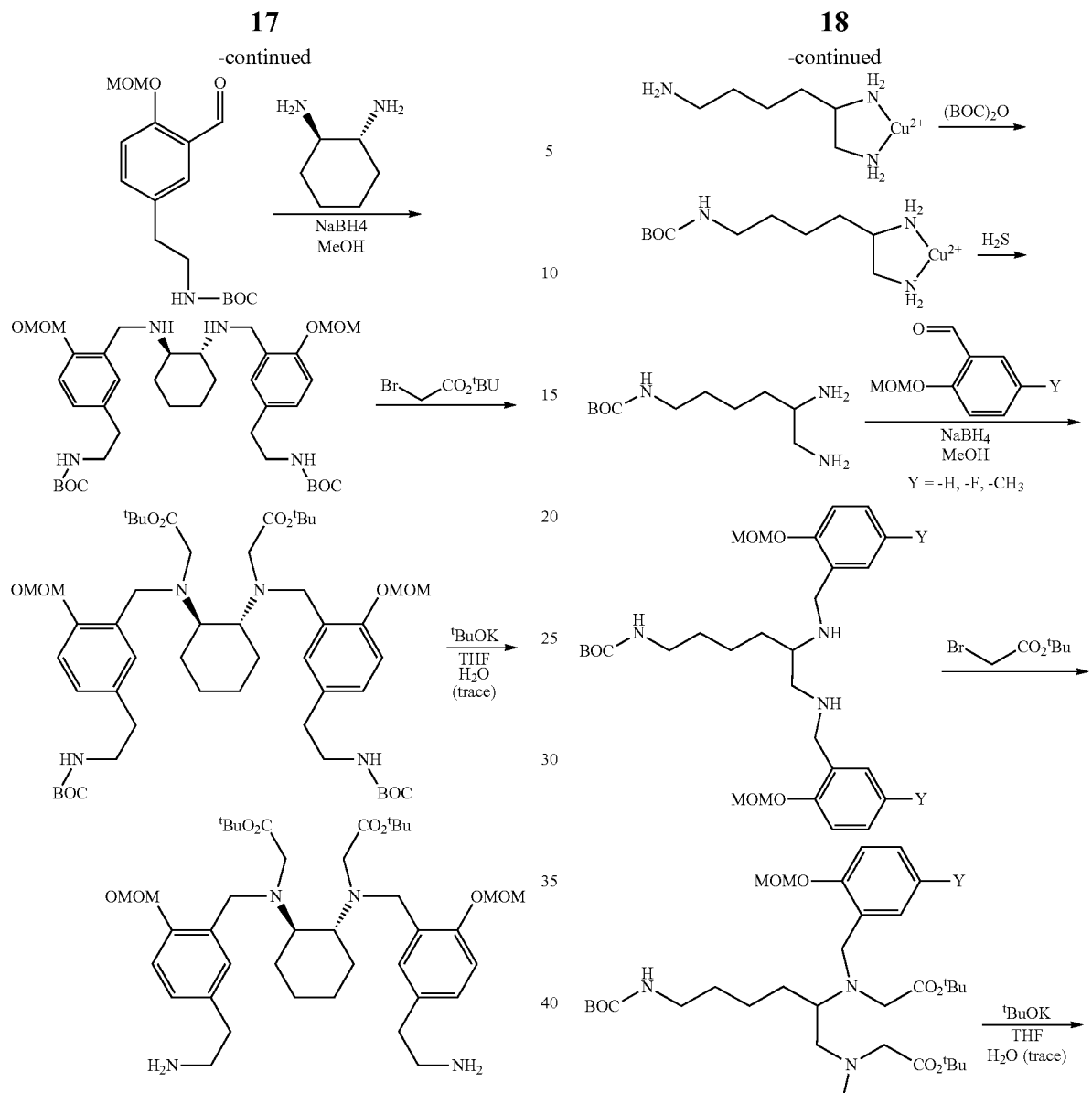
In another illustrative embodiment, compounds represented by Formula (I) can be prepared as generally set forth below in Scheme III.
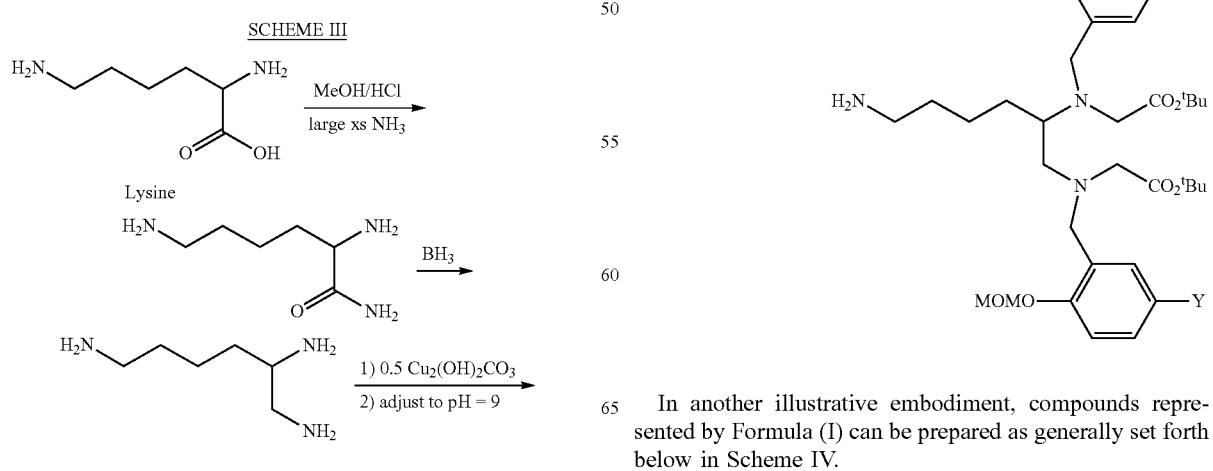
In another illustrative embodiment, compounds represented by Formula (I) can be prepared as generally set forth below in Scheme IV.

SCHEME IV

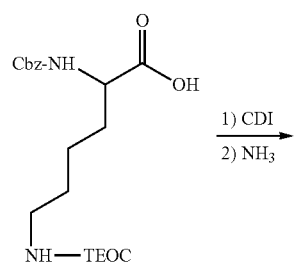

1) CDI
2) NH₃

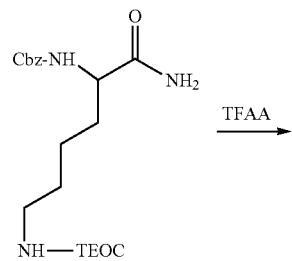

TFAA

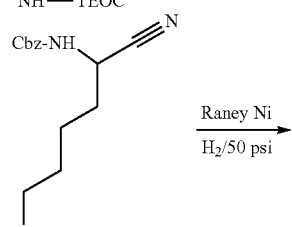

Raney Ni
H₂/50 psi

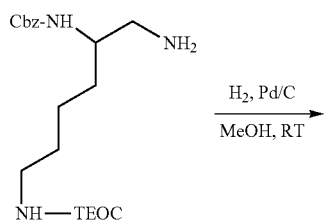

H₂, Pd/C
MeOH, RT

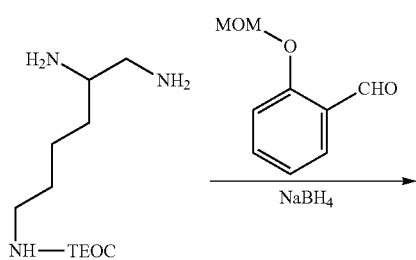

NaBH₄

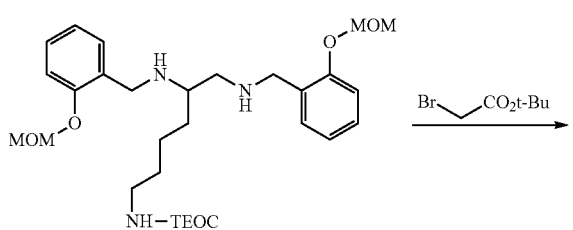

Br—CH₂—CO₂t-Bu

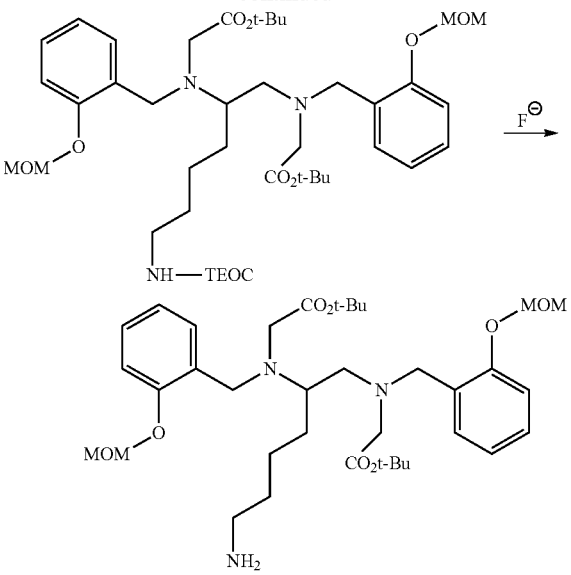

F⁻ where Cbz is carboxybenzyl. TEOC is a 2-(trimethylsilyl) ethoxycarbonyl group and MOM is methyloxymethyl and used to protect the amine group and hydroxybenzyl group, respectively, during synthesis.

In general, any vicinal diamine represented by the following structure is a suitable starting compound for preparing a compound according to Formula (I) that can be immobilized.

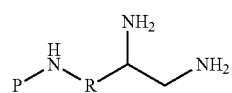

where R is a linear chain of at least two carbon atoms and up to 18 carbon atoms, terminated by a primary or secondary amine with an appropriate protecting group, P, such as, for example, a tert-butoxycarbonyl protecting group (BOC group).

If the immobilized ultra-chelator compound according to Formula (I) is to be used in an aqueous medium, it may be desirable to have a less hydrophobic tether than the C4 chain in the above formula. In the scheme below, the tether contains an ether linkage that allows for some hydrophilicity.

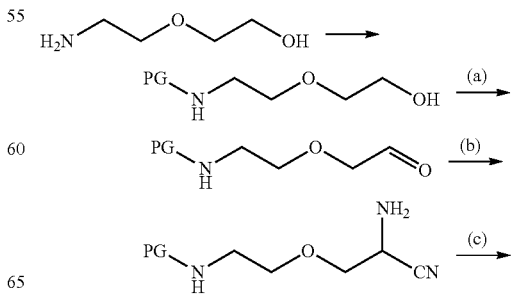

-continued

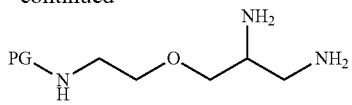

PG = appropriate protecting group, e.g., BOC, TEOC, etc.

(a) = Swern, Corey-Kim, PCC, Dess-Martin, etc.

(b) = Strecker (c) = Ni(Ra), H$_2$ (1-3 atm)

In an illustrative embodiment, a classic Strecker amino acid synthesis can be used in which the nitrile group in the amino nitrile intermediate is hydrolyzed to a carboxylic acid. In this case, the nitrile group instead is reduced to an aminomethyl group.

In another illustrative embodiment, a scheme that results in the appropriate vicinal diamine scaffold employs a Bamberger ring cleavage of an appropriately substituted imidazole. This scheme starts with a BOC-protected natural product, histamine, to provide a shorter 2-carbon tether:

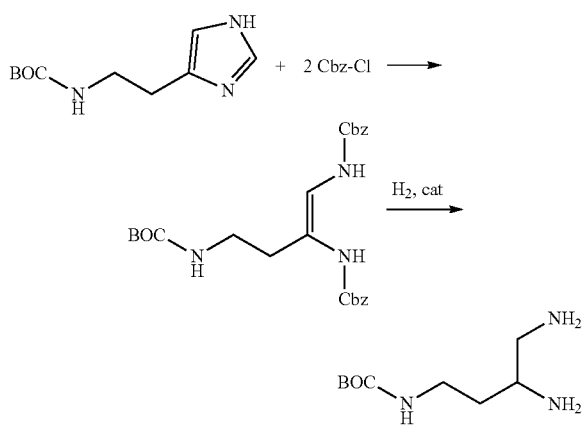

Other variants with a longer tether in the 4- or 5-position of the imidazole ring can be formed herein using similar methods.

Under conditions typically used to hydrogenate the double bond in a ring-opened intermediate, the Cbz groups can be lost. However, BOC-anhydrides induce the same ring cleavage, leaving a BOC-protected intermediate that undergoes double bond hydrogenation without loss of the protecting groups:

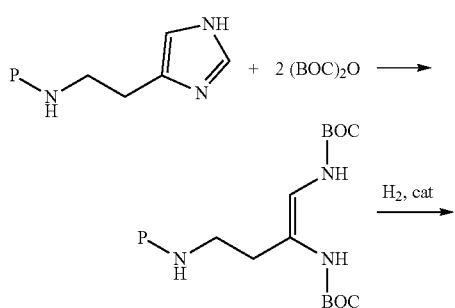

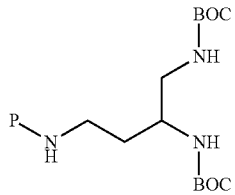

where P can be BOC or any other suitable protecting group.

The foregoing compounds represented by Formula (I) are merely exemplary; and the foregoing description provides a sufficiently detailed description of the compounds represented by Formula (I) within the scope of the present invention such that a person of ordinary skill in the art can readily appreciate both the variations within the scope of the description and how to make the various compounds within the scope of the description.

The organic polymer resin for covalently linking with the compounds represented by Formula (I) can be any organic polymer resin known for making metal-chelating resins. In some embodiments, the organic polymer resins can be in the form of microporous, mesoporous or gel beads. For example, the organic polymer resins can be in the form of small beads such as beads of about 0.001 to about 5 mm diameter. In an embodiment, the organic polymer resins can be in the form of small beads such as beads of about 0.1 to about 1 mm diameter. In general, suitable organic polymer resins include resins that are chemically stable toward harsh chemical environments such as, for example, a strong base, a strong acid, and atmospheric oxygen. It is also desirable, but not required, that the resins can be de-metallated, regenerated and recycled, thus reducing their cost of use.

Suitable organic polymer resins include, for example, a polymer or copolymer base of, for example, styrenic polymers or copolymers such as polystyrene and the like, acrylic polymers or copolymers such as polyacrylic resins and the like, methacrylic polymers and copolymers such as polymethacrylic resins and the like, with each containing one or more complementary reactive functionalities for covalently linking with the at least one linking group of the compounds represented by Formula (I). In an embodiment, suitable organic polymer resins include, for example, a modified polymer or copolymer base prepared by modifying the polymers or copolymers with a crosslinking agent such as divinylbenzene or the like, e.g., styrene-divinylbenzene copolymers, methacrylate-divinylbenzene polymers each containing one or more complementary reactive functionalities for covalently linking with the at least one linking group of the compounds represented by Formula (I). In an embodiment, suitable organic polymer resins include, for example, a polyacrylic acid or a polyethyleneimine backbone and a cyclic polyamine attached to a polyaddition and polycondensation resin.

As stated above, the organic polymer resins can be in the form of microporous, mesoporous or gel beads. Accordingly, in some embodiments, a filter system includes one or more columns in which the metal-chelating resin is loaded. In an embodiment, the column is vertically oriented to allow for passage of at least some liquid materials through the column by gravity. As will be understood by those of ordinary skill in the art, a pump may also be used in either a downwardly or upwardly flowing column, for example, to increase the flow rate that would be obtained by gravity alone, or for other reasons. As also will be understood, if the column is vertically oriented, to obtain countercurrent flow, i.e., to have the liquid flow upward through the column, a pump or other means may be used. Other means may include, for example, a reservoir of liquid material held at a position above the column, so that gravity can be used as the driving force for the countercurrent flow of the liquid material up through the column. Any suitable liquid transfer means known in the art may be used.

In an embodiment, the column is formed of a relatively inert or chemically unreactive material. Thus, in an embodiment, the column may be fabricated of a glass or in another embodiment of a fluorinated polymer or in yet another embodiment of a virgin polypropylene. Some fluorinated polymers have chemical resistance to various solvents and chemicals, including organic solvents and strong bases, and may be used. Examples include Teflon®, Avatrel®, polyvinylidene fluoride (PVDF), THV Fluorothermoplastic (Dyneon, St. Paul Minn.), Hostaflon TF 5035 (Dyneon), fluorinated ethylene propylene (FEP), polytetrafluoroethylene (PTFE), and perfluoroalkoxy polymer (PFA), among others. However, any suitable material may be selected for use as the column.

As will be recognized, it is not necessary for a packed column to be oriented in any particular direction or orientation. The column may be vertical, horizontal, coiled or arranged in any suitable way, provided that it can be loaded with the metal-chelating resin and that the appropriate liquids can be passed through it. The rate of passage of the solution through the column can vary depending on such factors as the product being passed, or when in service or in regeneration.

In some illustrative embodiments, an organic polymer resin can be a filter membrane. A "filter," refers to an article having a structure that includes a filter membrane. For example, the filter can be in any useful form for a filtering process, such as a porous membrane, the filter being made from one or more filter materials such as polymers, including synthetic and natural polymers, metal-containing materials, such as alloys, natural materials, ceramic, carbon fiber, etc. Further, in some aspects, the material of the filter can have a chemistry suitable for attachment to the linking arms of the compounds represented by Formula (I). Alternatively, the surface of the filter material can be modified so that it is chemically reactive with the linking arms of the compounds represented by Formula (I). In some embodiments, the compounds represented by Formula (I) can be covalently bound to the filter membrane.

The filter can be in any desired form suitable for a filtering application. Material that forms the filter can be a structural component of a filter itself and that provides the filter with a desired architecture. The filter can be porous or non-porous and can be of any desired shape or configuration. The filter per se can be a unitary article such as a nonwoven porous filter membrane.

In some embodiments, the filter material is formed from a polymeric material, a mixture of different polymeric materials, or a polymeric material and a non-polymeric material. Polymeric materials forming the filter can be crosslinked together to provide a filter structure with a desired degree of integrity. Polymeric materials that can be used to form the filter membranes disclosed herein include, for example, hydrophobic polymers. In some embodiments, the membranes include a polyolefin or a halogenated polymer. Suitable polyolefins include, for example, polyethylene (PE), polypropylene (PP), polymethylpentene (PMP), polybutene (PB), polyisobutylene (PIB), and copolymers of two or more of ethylene, propylene, and butylene. In a further illustrative embodiment, the membranes include ultra-high molecular weight polyethylene (UPE). UPE filter materials, such as UPE membranes, are typically formed from a resin having a molecular weight (weight average molecular weight) greater than about $1 \times 10^6$ Daltons (Da), such as in the range of about $1 \times 10^6$ to $9 \times 10^6$ Da, or $1.5 \times 10^6$ to $9 \times 10^6$ Da. Crosslinking between polyolefin polymers such as polyethylene can be promoted by use of heat or crosslinking chemicals, such as, for example, peroxides (e.g., dicumyl peroxide or di-tert-butyl peroxide), silanes (e.g., trimethoxyvinylsilane), or azo ester compounds (e.g., 2,2'-azo-bis(2-acetoxy-propane). Suitable halogenated polymers include polytetrafluoroethylene (PTFE), polychlorotrifluoro-ethylene (PCTFE), fluorinated ethylene polymer (FEP), polyhexafluoropropylene, and polyvinylidene difluoride (PVDF).

In other embodiments, the filter membranes include a polymer chosen from polyamides, polystyrenes, polyimides, polysulfones, polyether-sulfones, polyarylsulfone polyamides, polyacrylates, polyesters, nylons, celluloses, cellulose esters, polycarbonates, or combinations thereof.

As discussed above, the filter can include a porous filter membrane with a compound represented by Formula (I) appended to the polymeric material that forms the membrane. As used herein, a "porous filter membrane" is a porous solid that contains porous (e.g., microporous) interconnecting passages that extend from one surface of the membrane to an opposite surface of the membrane. The passages generally provide tunnels or paths through which a liquid being filtered must pass. Metal species of sizes small enough to pass through the pores of the membrane can be trapped on the membrane by interaction with the compound represented by Formula (I), such as by a chelation interaction between the compound represented by Formula (I) and the metal. This is referred to as a "non-sieving filtration mechanism."

The filter can also function to prevent any particles (e.g., metal containing particles) present within an aqueous or non-aqueous solution that are larger than the pores from entering the microporous membrane or can function to trap the particles within the pores of the microporous membrane (i.e., wherein particles are removed by a sieving-type filtration mechanism). The solution to be treated can pass through the membrane resulting in flow-through having a reduced amount of metals, such as a reduced amount of ionic metal species, a reduced amount of metal-containing particulates, or both.

Accordingly, a porous polymeric membrane on which the compound represented by Formula (I) is attached can remove metal and metal ion contaminants in a solution that is passing through the membrane, as well as any material that is of a size too large to pass through the pores of the membrane.

Porous membranes of the disclosure can be described with reference to one or more properties of the membrane. Example porous polymeric filter membranes as described herein can be characterized by physical features that include pore size, bubble point, and porosity. For example, the membrane can be described in terms of bubble point, which is commonly used to reflect pore size.

The bubble point method is based on the premise that, for a particular fluid and pore size with constant wetting, the pressure needed to force an air bubble through the pore is in inverse proportion to the size of the hole. The diameter of the capillary can be calculated by determining the pressure required to force water out of the capillary. A Porosimetry Bubble Point test method measures the pressure required to push air through the wet pores of a membrane. A bubble point test is thus a well-known method for determining the pore size of a membrane. To determine the bubble point of a porous material a sample of the porous material is immersed in and wetted with ethoxy-nonafluorobutane HFE 7200 (available from 3M) at a temperature of 20-25° C. (e.g., 22° C.). A gas pressure is applied to one side of the sample by using compressed air and the gas pressure is gradually increased. The differential pressure at which wet flow is equal to one-half the dry flow (flow without wetting solvent) is called the bubble point.

In certain aspects of the disclosure, the porous polymeric membrane can have a bubble point in the range of from about 2 psi to about 400 psi, about 4 psi to about 200 psi, or about 4 psi to about 160 psi, when ethoxy-nonafluorobutane (HFE-7200) is used as the wetting solvent, and at a temperature of 22° C.

Alternatively, pore size can be measured by known techniques such as by Mercury Porosimetry (MP), Scanning Electron Microscopy (SEM), Liquid Displacement (LLDP), or Atomic Force Microscopy (AFM).

The porous polymeric filter membrane can have any pore size that will allow the filter membrane to be effective for performing as a filter membrane. The pore size can be correlated with bubble point determination. In some embodiments, porous membranes can have an average pore size in a range of from about 0.001 microns to about 5 or 10 microns, e.g., from 0.01 to 0.8 microns. The average pore size can be selected based on one or more factors that include: fluid flow rate, pressure, pressure drop considerations, viscosity considerations, impurities in the liquid to be treated (such as amount of metal impurities), and any particle size of the impurities.

Further, the filter membranes disclosed herein contemplate use of polymeric membranes with generally uniform pore sizes resulting from a higher degree of pore symmetry, as well as membranes with non-uniform pore sizes (variable pore diameters) resulting from pore asymmetry. Pores can be isotropic or anisotropic, skinned or unskinned, symmetric or asymmetric, and any combination of these.

A porous polymer filter layer as described may have any porosity that will allow the porous polymer filter layer to be effective as described herein. Example porous polymer filter layers can have a relatively high porosity, for example, a porosity of at least 60, 70 or 80 percent. As used herein, and in the art of porous bodies, a "porosity" of a porous body (also sometimes referred to as void fraction) is a measure of the void (i.e., "empty") space in the body as a percent of the total volume of the body and is calculated as a fraction of the volume of voids of the body over the total volume of the body. For example, a body that has zero percent porosity is completely solid.

Porous filter membranes disclosed herein can be of any desired geometric configurations suitable for use in a system for reducing metal or metal ion contamination in an aqueous or non-aqueous solution. For example, the porous filter membranes disclosed herein can have any one or more of a variety of geometric configurations or forms such as one or more shapes selected from circular, semi-circular, oval, semi-oval, or polygonal such as square, rectangular, hexagonal, or octagonal, etc. The porous filter membrane can be in the form of a flat sheet, a corrugated sheet, a pleated sheet, and a hollow fiber, among others.

A porous polymeric filter membrane as disclosed herein can be in the form of a sheet or hollow fiber having any useful thickness, e.g., a thickness in a range from about 20 to about 400 microns, e.g., from about 40 or about 80 to about 100 or about 200 microns.

Porous filter membranes disclosed herein can be associated with a support structure, a housing, or both. For example, a porous filter membrane can be supported by a frame, bracket, clip, web, net, and cage, and the like. In some constructions, at least part of the support structure can be a housing, as described herein. Alternatively, the porous membrane is unsupported.

The porous filter membrane can be present as a part of a filter assembly or a filter cartridge that includes a housing. For example, the housing is fluidically sealed (aside from inlet and outlet ports) and able to hold a volume of liquid and configured to allow the liquid to pass through the membrane. A housing can be used to form a larger filter structure such as a filter assembly (single or multilayer) or a filter cartridge that is used in a filtering system. The filtering system will place the filter membrane, e.g., as part of a filter assembly or as part of a filter cartridge, in a filter housing to expose the filter membrane to a flow path of a liquid chemical to cause at least a portion of the flow of the liquid chemical to pass through the filter membrane, so that the filter membrane removes an amount of the impurities or contaminants from the liquid chemical. The structure of a filter assembly or filter cartridge may include one or more of various additional materials and structures that support the composite filter membrane within the filter assembly or filter cartridge to cause fluid to flow from a filter inlet, through the filter material (e.g., filter membrane), and through a filter outlet. The filter membrane supported by the filter assembly or filter cartridge can be in any useful shape, e.g., a pleated cylinder, a cylindrical pad, one or more non-pleated (flat) cylindrical sheets, a pleated sheet, among others.

An illustrative embodiment includes a filter device and a method of removing metal contaminants from an aqueous and/or non-aqueous solution, wherein the solution is passed through a porous polymeric membrane that has the compound represented by Formula (I) affixed thereto. In a non-limiting illustrative embodiment, FIG. 1 illustrates a filter 100 that includes a porous polymeric membrane 102. The porous polymeric membrane 102 includes a ligand affixed on a surface of the membrane. The filter 100 can have a housing 104 that provides a structure to the filter 100 and that fluidically seals an internal portion of the filter. The housing 104 can be any shape and size, such as cylindrical, polygonal, etc.

One portion of the filter can include an inlet port 106, to receive a metal/metal ion-containing aqueous or non-aqueous solution to be filtered. The inlet port 106 can be configured to be connected to a fluid supply line. As such, the inlet port 106 can include, for example, a valve, a gasket, etc. (not shown) to facilitate connection to a fluid supply. The metal/metal ion-containing aqueous or non-aqueous solution to be filtered can flow through inlet port 106 in direction indicated by arrow 116, and into a headspace 114 in the filter 100, as defined by an input-facing surface 124 of porous polymeric membrane 102, the internal surface of the housing 104, and the inlet port 106. In embodiments, the filter can be constructed so the headspace has a volume that is a desired percentage of the total internal volume of the filter.

The internal portion of the filter can include the porous filter membrane in any suitable placement or arrangement, with FIG. 1 showing the porous polymeric membrane 102 having a disc-like architecture (a cross-sectional view is shown). A side 122 of the porous polymeric membrane 102, such as the outer circumference of the membrane, can be in contact with the inner surface of the housing 104. The porous polymeric membrane 102 can also have an input-facing surface 124, which first contacts the metal/metal ion-containing fluid, and an output-facing surface 126, from which treated fluid with reduced amounts of metal/metal ions flow. Aspects of the filter can optionally be described in terms of the range of the ratio of the surface area of the input-facing surface 124 to the volume of the porous polymeric membrane 102, or the ratio of the surface area to the thickness of the filter.

The filter 100 can also include one or more features that support the porous polymeric membrane 102 within the filter. Any arrangement for supporting the filter can be used and can include one or more distinct structural feature(s), such as a frame, frame, bracket, clip, web, net, and cage, and the like, or a material such as an adhesive can be used to support the membrane. A combination of an adhesive and a structural supporting feature can be used. In an embodiment, and with reference to FIG. 1, the filter includes a frame having frame portions 110 and 112, with frame portion 110 in contact with the inner surface of the housing 104, which is attached to portion 112. Portion 112 can be in contact with the output-facing surface 124 of the porous polymeric membrane 102 and can provide support to the membrane during filtering. Frame portion 112 can have a grid-like structure to freely allow filtered liquid to pass into the backspace 120 of the filter, while still providing structural support to the polymeric porous membrane under increased fluidic pressures.

In use, an aqueous or non-aqueous solution enters the filter through inlet port 106 in the direction indicated by arrow 116, and then fills the headspace 114 within the filter 100. Sufficient fluidic pressure is applied to cause the solution to move through the porous polymeric membrane at a desired flow rate. Exemplary flow rates for porous membranes can range from about 0.1 L/min to about 40 L/min, or about 5 L/min to about 20 L/min. Alternatively, the flow rate for a porous membrane is expressed in terms of the amount of liquid flowed per area of the filter per time (e.g., Liter/m.sup.2/h=LMH), such as about 100 LMH/bar to about 30,000 LMH/bar, or about 5,000 LMH/bar to about 15,000 LMH/bar. The filtered liquid having a reduced metal content then exits the filter through outlet port 108 in the direction indicated by arrow 128.

In some embodiments, a filter disclosed herein can include a composite membrane arrangement. For example, a filter with a composite membrane can include two or more filter materials, such as two or more filter articles. In an embodiment, the filter can include a first porous polymeric membrane that includes one of the compounds represented by Formula (I), and a second filter material that does not include the compound represented by Formula (I) present in the first porous polymeric membrane (i.e., a different ligand or some other ligand) or that is in some way different from the first porous polymeric membrane. The second filter material can also be in the form of a porous membrane, or can be different, such as having a non-porous form. The second filter material can be made of the same or of a different polymeric material than the first membrane, and can either be modified, such as modified with a compound represented by Formula (I) not present in the first membrane (e.g., the ligand), or unmodified.

In some embodiments, the filter includes a first porous polymeric membrane that includes the compound represented by Formula (I), and a second porous polymeric membrane that includes no compound represented by Formula (I) or a different compound represented by Formula (I). In certain embodiments, the first and second porous polymeric membranes are constructed from the same or a similar polymeric material and have the same or a similar pore size. In other embodiments, the first and second porous polymeric membranes are constructed from the different polymeric materials and/or have different pore sizes.

There are various available linking chemistries that allow chelates to be immobilized in a stable manner onto a resin made of an organic polymer. Suitable chelating resins should be able to endure acidic and/or basic operating environments in the presence of air. As stated hereinabove, the metal-chelating resins disclosed herein are believed to be chemically stable when used in manufacturing environments. By chemically stable, it is meant that the metal-chelating resins will not undergo dissolution in acidic and/or basic operating environments. Thus, the metal-chelating resins disclosed herein are believed to be stable towards acid (i.e., hydrolytic stability at low pH), stable towards base (i.e., hydrolytic stability at high pH), stable towards heat (i.e., thermal stability), stable towards oxygen (i.e., air) and oxidizing environments, stable towards reducing environments, and stable toward exposure to light (i.e., photostability).

Accordingly, in an illustrative embodiment, the linking-chemistry used herein involves the use of hydrocarbon linkages (e.g., arene, alkane, alkylarene, arylalkane, etc.), amine linkages (e.g., —NR—) and ether linkages (e.g., —O—). In other illustrative embodiments, sulfone linkages (e.g., —(O)S(O)—) and sulfoxide linkages (e.g., —S(O)—) can be used. Due to oxidative instability, reductive instability, photo-instability or hydrolytic instability at low pH (pH=0-3) or at high pH (pH=11-14), the following linking groups or linking chemistries are generally unsuitable and cannot be used in the present application: amides (—C(O)—NR—), esters (—C(O)—O—), carbamates (—NR—C(O)—O—), ureas (—NR—C(O)—NR—), carbonates (—O—C(O)—O—), diazenes (—N=N—), hydrazine (—NR—NR—), and thioethers (—S—).

Representative examples of suitable linking chemistries that can be used to link the compounds of Formula (I) with an organic polymer resin are shown below:

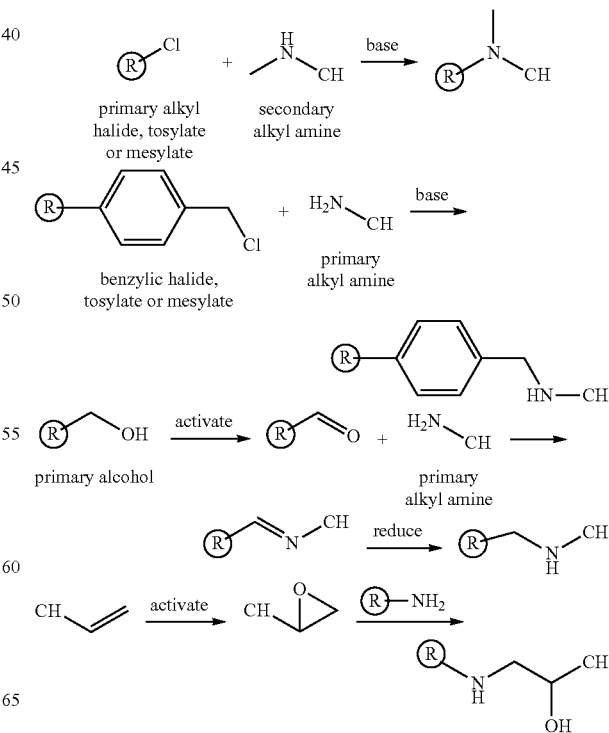

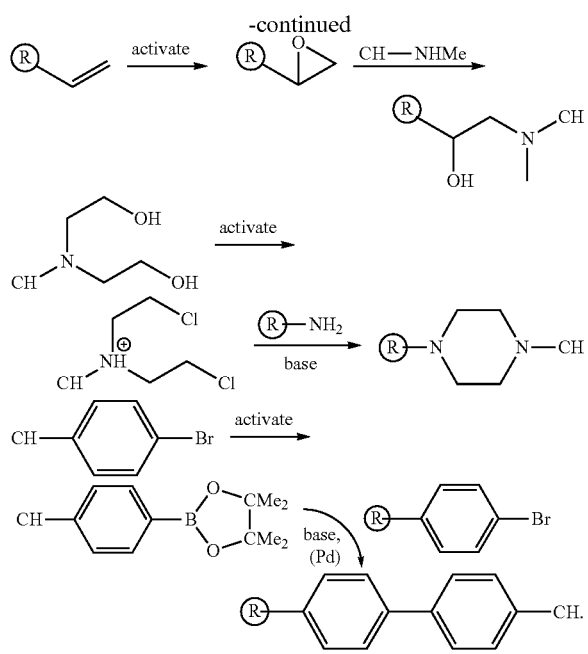

R = Resin
CH = Resin

In some embodiments, the metal-chelating resins can be provided in sodium salt form or potassium salt form. If desired, the sodium ion or potassium ion can be removed from the resin prior to its use in order to prevent sodium or potassium from entering the solution treated with the resin. This can be accomplished by replacing the sodium cation or potassium cation with another cation such as, for example, a $H^+$, $Me_4N^+$ or other quaternary ammonium cation.

In general, the compounds represented by Formula (I) can be covalently linked with an organic polymer resin by methods known in the art. For example, in an illustrative embodiment, a metal-chelating resin can be prepared by reacting a compound represented by Formula (I) having at least one linking group, or at least one ligating atom (e.g., a nitrogen atom) with the organic polymer resin which is chemically activated so as to contain one or more complementary reactive functionalities for covalently linking with the attachment site(s) on the compound represented by Formula (I).

In cases where the linking group or ligating atom of the compounds represented by Formula (I) (e.g., a nitrogen atom) are in a protected form, the protecting group must first be removed (or selectively removed) prior to immobilization on the organic polymer resin. Once the compounds represented by Formula (I) are covalently linked to the organic polymer resin (immobilized) any remaining protecting groups (e.g., on the 2-hydroxybenzyl moieties) must then be removed to activate the "ultra chelating" function of the resin.

The one or more of the compounds represented by Formula (I) can be reacted with the organic polymer resin at a temperature and time period suitable to covalently bond the one or more complementary reactive functionalities of the organic polymer resin with the at least one linking group of the compounds represented by Formula (I). In general, the one or more of the compounds represented by Formula (I) can be reacted with the organic polymer resin in a stoichiometric excess or a stoichiometric deficiency of the activated organic polymer resin ranging from about 0.1 equivalent to about 10 equivalent of organic polymer resin to the one or more of the compounds represented by Formula (I). In an embodiment, a suitable temperature includes, for example, a temperature ranging from about 20° C. to about 200° C. In another embodiment, a suitable temperature includes, for example, a temperature ranging from about 40° C. to about 160° C. In an embodiment, a suitable time period for carrying out the reaction can range from about 1 hour to about 200 hours. In an embodiment, a suitable time period for carrying out the reaction includes, for example, a time period ranging from about 12 hours to about 120 hours.

If desired, the reaction can be carried out in a solvent. Suitable solvents include, for example, benzene, fluorobenzene, benzonitrile, acetonitrile, propionitrile, toluene, xylene, tetrahydrofuran, 1,2-dimethoxyethane, p-dioxane, diglyme, triglyme, dimethylsulfoxide, N,N-dimethylformamide, N,N-dimethylacetamide, hexamethylphosphoramide, N-methylpyrrolidone and the like.

In an illustrative embodiment, a metal-chelating resin disclosed herein can be prepared by stepwise solid-state synthesis of a compound represented by Formula (I) on an organic polymer resin. In another illustrative embodiment, a metal-chelating resin disclosed herein can be prepared by first forming a chelating pre-polymer (monomer), followed by polymerization and bead formation. In this embodiment, a compound represented by Formula (I) is covalently linked with the organic polymer resin by (i) reacting one of the compounds represented by Formula (I) with a suitable monomer, (ii) polymerizing the functionalized monomer in the presence of a crosslinking agent, a pore-forming agent and a polymerization catalyst under suitable polymerization conditions and (iii) forming beads of the metal-chelating resins disclosed herein, see, e.g., Zhou et al., *Biomacromolecules*, 9(5), pp. 1372-1380 (2008).

As discussed above, the metal-chelating resins disclosed herein are believed to be capable of containing, in some illustrative embodiments, immobilized "ultra chelates," that is, the compounds (i.e., metal-chelates) represented by Formula (I) are believed to possess strong (i.e., high) metal-binding constants ($K_f$) for many divalent, trivalent metal and higher-valent ions of interest. While not wishing to be bound by theory, it is believed that the strong binding constants of the metal-chelates represented by Formula (I) are a result of one or more of (a) selecting suitable ligating atoms that have high affinity for the sequestered metal-ion, (b) positioning the ligating atoms in the chelate structure so as to have favorable geometric arrangements in order to accommodate the bonding requirements metal-ion, (c) adding coordinating arms to amines which leads to suitable chelating arrangements and (d) properly utilizing the "chelate-effect" in order to enhance metal-chelate binding strength.

Accordingly, when a compound represented by Formula (I) is covalently linked with an organic polymer resin to form a metal-chelating resin as disclosed herein, it is believed to be capable of removing metal ions and associated metallic species to significantly lower levels from any aqueous solution and non-aqueous solutions containing such metals. In non-limiting illustrative embodiments, the resulting metal-chelating resin as disclosed herein can be used in removing metals from, for example, solutions of quaternary ammonium salts, solutions of quaternary ammonium hydroxides and processing solutions used in the microelectronics industries. In an illustrative embodiment, a non-aqueous solution is a solution containing one or more organic solvents. Suitable organic solvents include, for example, one or more low molecular weight alcohols and one or more polyalcohols.

Representative examples of low molecular weight alcohols include those having 1 to about 13 carbon atoms and/or a molecular weight of no greater than about 200. A suitable low molecular alcohol can be selected from a variety of low-molecular-weight monohydric alcohols, each comprising about 1 to about 13 carbon atoms. Suitable monohydric alcohols include, for example, methanol, ethanol, 1-propanol, isopropyl alcohol, butanol, isobutyl alcohol, tert-butyl alcohol, hexanol, 2-ethylhexanol, dodecanol, and the like. Suitable polyalcohols include, for example, a straight or branched, aliphatic or aromatic diols, triols, higher functional polyols that have an average functionality of greater than three. In an illustrative embodiment, the one or more polyalcohols can have, for example, from about 1 to about 50 carbon atoms and from 2 to 10 hydroxy groups. In an illustrative embodiment, the one or more polyalcohols can have, for example, from about 2 to about 50 carbon atoms and from 2 to 10 hydroxy groups. Suitable diols include, for example, ethylene glycol, diethylene glycol, triethylene glycol, propylene glycol, dipropylene glycol, trimethylene glycol, butylene glycols, neopentyl glycol, and the like.

In an embodiment, a non-aqueous solution is a solution containing a liquid organic solvent such as, for example, liquid amines. In another embodiment, an aqueous solution/non-aqueous solution is a solvent mixture containing water and an organic solvent such as, for example, one or more alcohol solvents such as methanol, ethanol, propanol, isopropanol and butanol.

In an illustrative embodiment, at ambient temperatures compounds represented by Formula (I) can have an aqueous binding constant ($K_f$) for $Fe^{3+}$ of greater than or equal to about $10^{34}$. In an embodiment, compounds represented by Formula (I) can have a binding constant ($K_f$) for $Fe^{3+}$ of greater than or equal to about $10^{39}$. In an illustrative embodiment, compounds represented by Formula (I) can have a binding constant ($K_f$) for $Al^{3+}$ of greater than or equal to about $10^{20}$. In an embodiment, compounds represented by Formula (I) can have a binding constant ($K_f$) for $Al^{3+}$ of greater than or equal to about $10^{25}$. In an embodiment, compounds represented by Formula (I) can have binding constants ($K_f$) for $Zn^{2+}$, $Ni^{2+}$ and $Cu^{2+}$ of greater than or equal to about $10^{20}$, about $10^{21}$ and about $10^{22}$, respectively.

In general, as one skilled in the art will appreciate, strong metal-chelate binding constants are difficult to measure, but established methods are known in the art. For example, such methods include (a) pH titrations in the presence of competing $H^+$ using calibrated pH electrodes, (b) pM titrations in the presence of a competing metal ion using calibrated pM metal-ion specific electrodes, (c) thermometric titrations in the presence of a competing metal ion, (d) spectroscopic titrations (UV-visible) in the presence of competing $H^+$, (e) spectroscopic titrations (UV-visible) in the presence of competing metal ions, (f) spectroscopic titrations (UV-visible) in the presence of competing chelates with known binding properties, (g) radiometric titrations in the presence of immobilized metal-chelates, and (h) radiometric analysis of metal-chelate mixtures in the presence of metal-ion-permeable osmosis membranes and the like.

The metal-chelating resins disclosed herein are useful in reducing the level of one or more metallic components such as one or more soluble metallic components contained in an aqueous solution and/or a non-aqueous solution such as, for example, solutions of quaternary ammonium hydroxides and solutions of quaternary phosphonium hydroxides, or from processing solutions used in the microelectronics industry. Representative examples of quaternary ammonium hydroxides to be purified include tetramethylammonium hydroxide, tetraethylammonium hydroxide, tetra-n-propylammonium hydroxide, tetra-n-butylammonium hydroxide, tetra-n-octylammonium hydroxide, trimethyl-2-methoxyethylammonium hydroxide, benzyltrimethylammonium hydroxide, benzyltriethylammonium hydroxide, N,N-dimethylpyrrolidinium hydroxide, N,N-dimethylpiperidinium hydroxide, N,N'-diisopropylimidazolinium hydroxide and N-alkylpyridinium hydroxide. Representative examples of quaternary phosphonium hydroxides to be purified include tetramethyl phosphonium hydroxide, tetraethyl phosphonium hydroxide, tetrapropylammonium hydroxide and tetrabutyl phosphonium hydroxide.

In general, aqueous and non-aqueous solutions or processing solutions used in the microelectronics industry will contain some amount of undesired metals such as divalent metals and trivalent metals. Thus, it is believed that the metal-chelating resins disclosed herein can reduce the content of the undesired metals contained in these solutions to significantly lower levels, such as, for example, less than or equal to 10 ppt and even lower, e.g., less than 1 ppt. Representative examples of divalent metals include barium ($2^+$), beryllium ($2^+$), cadmium ($2^+$), calcium ($2^+$), cobalt ($2^+$), copper ($2^+$), europium ($2^+$), iron ($2^+$), lead ($2^+$), magnesium ($2^+$), manganese ($2^+$), mercury ($2^+$), nickel ($2^+$), osmium ($2^+$), platinum ($2^+$), ruthenium ($2^+$), strontium ($2^+$), tin ($2^+$), and zinc ($2^+$). Representative examples of trivalent metals include chromium ($3^+$), iron ($3^+$), aluminum ($3^+$), gadolinium ($3^+$), lanthanum ($3^+$), gallium ($3^+$) and indium ($3^+$).

In non-limiting illustrative embodiments, the initial concentration of the heavy metal in the solution can range from about 0.1 parts per million (ppm) to about 1000 ppm, or from about 0.1 ppm to about 500 ppm, or from about 1 ppm to about 500 ppm, or from about 1 ppm to about 100 ppm. The final concentration of the heavy metal in the solution can be range from about 0.02 parts per trillion (ppt) to about 10 ppt, or from about 0.02 ppt to about 5 ppt, or from about 0.1 ppt to about 5 ppt, or from about 0.1 ppt to about 1 ppt, or from about 0.2 ppt to about 1 ppt. In some embodiments, the final concentration of the heavy metal in the solution is less than 1 ppt.

In some embodiments, the solution containing the heavy metal can have an acidic pH. For example, the solution can have an acidic pH of about 0 to about 5, or about 1 to about 5, or about 1 to about 4, or about 1 to about 3.

In some embodiments, the solution containing the heavy metal can have a basic pH. For example, the solution can have a basic pH of about 9 to about 14, or about 10 to about 14, or about 12 to about 14.

In some embodiments, the solution containing the heavy metal can have a neutral pH. For example, the solution can have a neutral pH of about 6 to about 8.

The solution can also contain one or more background metals such as calcium, zinc, magnesium, or sodium.

The aqueous and non-aqueous solutions can be contacted with the metal-chelating resins in a variety of different ways generally depending upon the state of the metal-chelating resins. For example, solutions to be demetallated can be combined with the metal-chelating resins in a stirred container, or the solutions can be passed through a column where the column contains the metal-chelating resins, or the solutions can be passed through media such as a filter as discussed above containing the metal-chelating resins. There is no particular limitation as to the methodology of contacting the aqueous/non-aqueous solutions with the metal-chelating resins.

In general, the one or more metals are removed from the aqueous or non-aqueous solutions by contacting the solutions containing the one or more metals with a metal-chelating resin disclosed herein for a time sufficient to reduce the concentration of the one or more metals in the solution to the desired level. The time period can range widely and can range from about 2 hours to about 96 hours. As one skilled in the art will readily appreciate, the solutions containing a quaternary ammonium salt together with metallic impurities may be optionally concentrated or treated to facilitate the purifying process. That is, the concentration of the quaternary ammonium hydroxide in the solution may be increased prior to contact with a metal-chelating resin. In some embodiments, the solution can be diluted with an additional solvent prior to contacting the solution with the metal-chelating resin. In some embodiments, the solution can be concentrated prior to contacting it with the metal-chelating resin. Concentration procedures are known to those skilled in the art and include, for example, evaporation, ion-exchange, electrodialysis, and reverse osmosis among others.

As stated above, in an illustrative embodiment, the aqueous solutions or non-aqueous solutions can be contacted with one or more of the metal-chelating resins disclosed herein by passing the solution through one or more columns in which the metal-chelating resin is loaded, as is known in the art. In an embodiment, the column is vertically oriented to allow for passage of at least some liquid materials through the column by gravity. As will be understood by those of ordinary skill in the art, a pump may also be used in either a downwardly or upwardly flowing column, for example, to increase the flow rate that would be obtained by gravity alone, or for other reasons. As also will be understood, if the column is vertically oriented, to obtain countercurrent flow, i.e., to have the liquid flow upward through the column, a pump or other means may be used. Other means may include, for example, a reservoir of liquid material held at a position above the column, so that gravity can be used as the driving force for the countercurrent flow of the liquid material up through the column. Any suitable liquid transfer means known in the art may be used.

In an embodiment, the column is formed of a relatively inert or chemically unreactive material. Thus, in an illustrative embodiment, the column may be fabricated of a glass or in another embodiment of a fluorinated polymer or in yet another embodiment of a polypropylene. Some fluorinated polymers have chemical resistance to various solvents and chemicals, including organic solvents and strong bases, and may be used. Representative examples include Teflon®, Avatrel®, polyvinylidene fluoride (PVDF), THV Fluorothermoplastic (Dyneon, St. Paul Minn.), Hostaflon TF 5035 (Dyneon), fluorinated ethylene propylene (FEP), polytetrafluoroethylene (PTFE), and perfluoroalkoxy polymer (PFA), among others. However, any suitable material for use as the column is contemplated.

As will be recognized, it is not necessary for a packed column to be oriented in any particular direction or orientation. The column may be vertical, horizontal, coiled or arranged in any suitable way, provided that it can be loaded with the metal-chelating resin and that the appropriate liquids can be passed through it. The rate of passage of the solution through the column can vary depending on such factors as the product being passed, or when in service or in regeneration.

Following the removal of the one or more metal components from the aqueous solution or non-aqueous solution, the metal-chelating resins disclosed herein can be recycled or discarded. The resulting solutions can then be used for their intended application. For example, solutions of the quaternary ammonium hydroxides can be packaged and stored prior to being used in such chemical industries as semiconductor industries.

The following example is provided to enable one skilled in the art to practice the invention and is merely illustrative of the invention. The example should not be read as limiting the scope of the invention. In the example, the following abbreviations are used.

DMF: purified N,N-dimethylformamide.

Chelate monohydrochloride: a compound having the following structure:

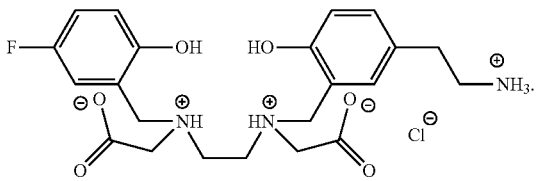

Example 1

One gram of activated (chloromethylated), crosslinked, porous polystyrene resin beads from Hecheng (about 3.0 mmol/g active organic chlorine, 0.2-0.6 mm) was suspended by gentle stirring in 10 mL of dry, high purity DMF solvent at room temperature under argon for a period of about 24 hours. Next, 9 mmol of the chelate monohydrochloride (4.37 g, fw=485.93) and 9 mmol LiOH·H$_2$O (0.38 g, fw=41.96) was suspended in 20 mL of DMF at 50° C. and stirred for 1 hour. The resin was recovered by suction filtration and then added to the chelate solution.

The mixture was purged with argon and heated at 50° C. with gentle stirring for a period of 60 hours. The mixture was cooled to ambient temperature, and the resin was then collected by filtration. The supernatant DMF solution was retained in order to recover the unreacted chelate for future use. The resin was washed with 3×16 mL of reagent grade DMF, 3×16 mL of purified water, 3×16 mL of absolute ethanol, 3×16 mL of 1.0 M aqueous hydrochloric acid, 3×16 mL purified water, 3×16 mL of 1.0 M aqueous sodium hydroxide and finally washed with 3×16 mL of purified water. The beads were then suspended in 16 mL of a 2.0 M aqueous copper acetate solution. Next, the beads were gently stirred for a period of about 4 hours at about 30° C. The colored beads were collected by filtration, washed with 3×16 mL of purified water and then washed with 3×16 mL methanol. The damp resin beads were air-dried by passing dry N$_2$ through the filter that contained the beads.

The resin beads that contained the immobilized chelate were subsequently washed with 3×16 mL of 6.0 M aqueous hydrochloric acid in order to remove the chelated copper. The supernatant hydrochloric acid solution was retained, weighed, analyzed for copper content, and the copper-binding capacity was calculated. Upon demetallation, the color of the chelating resin changed from medium green to a very pale yellow in color. The resin was then washed with 3×16 mL of purified water, 3×16 mL of 1.0 M aqueous sodium hydroxide, 3×16 mL of purified water followed by resuspension in 16 mL of 2.0 M aqueous copper acetate solution. The resin beads were washed, regenerated and handled as before. The copper-binding capacity was measured again after one cycle of regeneration.

Various features disclosed herein are, for brevity, described in the context of a single embodiment, but may also be provided separately or in any suitable sub-combination. All combinations of the embodiments are specifically embraced by the illustrative embodiments disclosed herein just as if each and every combination was individually and explicitly disclosed. In addition, all sub-combinations listed in the embodiments describing such variables are also specifically embraced by the present formulations and are disclosed herein just as if each and every such sub-combination was individually and explicitly disclosed herein.

It will be understood that various modifications may be made to the embodiments disclosed herein. Therefore, the above description should not be construed as limiting, but merely as exemplifications of certain embodiments. For example, the functions described above and implemented as the best mode for operating the embodiments disclosed herein are for illustration purposes only. Other arrangements and methods may be implemented by those skilled in the art without departing from the scope and spirit of this invention. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. A metal-chelating resin, comprising:
   (a) a compound represented by Formula (I):

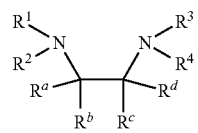
(I)

or a stereoisomeric form thereof or a salt thereof, wherein one of $R^1$ and $R^2$, and one of $R^3$ and $R^4$ are independently a protonated or deprotonated, substituted or unsubstituted 2-hydroxybenzyl moiety containing at least one linking group for covalently linking the compound of Formula (I) to an organic polymer resin, wherein the at least one linking group is represented by the formula —$(CH_2)_x$—$NHR^5$ where x is 2 to 6, and $R^5$ is independently hydrogen, methyl or ethyl, and the other one of $R^1$ and $R^2$, and the other one of $R^3$ and $R^4$ are independently a protonated or deprotonated, substituted or unsubstituted carboxyalkyl-containing moiety, wherein the alkyl group is a substituted or unsubstituted methylene group or a substituted or unsubstituted ethylene group optionally containing another linking group for covalently linking the compound of Formula (I) to the organic polymer resin; and
   $R^a$, $R^b$, $R^c$ and $R^d$ are hydrogen; and
   (b) an organic polymer resin comprising a styrenic polymer or copolymer having at least one complementary reactive functional group covalently linked with the at least one linking group of the compound represented by Formula (I).

2. The metal-chelating resin of claim 1, wherein $R^5$ is hydrogen.

3. The metal-chelating resin of claim 1, wherein $R^5$ is methyl.

4. The metal-chelating resin of claim 1, wherein $R^5$ is ethyl.

5. The metal-chelating resin of claim 1, wherein the protonated or deprotonated, substituted or unsubstituted 2-hydroxybenzyl moiety independently is a moiety represented by the structure of Formula (II) or a moiety represented by the structure of Formula (III):

(II)

(III)

wherein R is independently hydrogen, a linear or branched $C_1$ to $C_4$ alkyl moiety, a linear or branched $C_1$ to $C_4$ hydroxyalkyl or a linear or branched $C_1$ to $C_4$ alkyl moiety containing one or more ether linkages, $R^L$ is the linking group for covalently linking the compound of Formula (I) to the organic polymer resin, and Y is hydrogen.

6. The metal-chelating resin of claim 5, wherein the protonated or deprotonated, substituted or unsubstituted carboxyalkyl-containing moiety independently is a protonated or deprotonated, substituted or unsubstituted carboxymethyl moiety represented by the structure of Formula (IV) or a protonated or deprotonated, substituted or unsubstituted carboxymethyl moiety represented by the structure of Formula (V):

(IV)

(V)

wherein R is independently hydrogen, a linear or branched $C_1$ to $C_4$ alkyl moiety, a linear or branched $C_1$ to $C_4$ hydroxyalkyl or a linear or branched $C_1$ to $C_4$ alkyl moiety containing one or more ether linkages, and $R^L$ is another linking group for covalently linking the compound of Formula (I) to the organic polymer resin.

7. The metal-chelating resin of claim 5, wherein the protonated or deprotonated, substituted or unsubstituted carboxyalkyl-containing moiety independently is a protonated or deprotonated, substituted or unsubstituted carboxyethyl moiety represented by the structure of Formula (VI) or a protonated or deprotonated, substituted or unsubstituted carboxyethyl moiety represented by the structure of Formula (VII):

(VI)

(VII)

wherein R is independently hydrogen, a linear or branched $C_1$ to $C_4$ alkyl moiety, a linear or branched $C_1$ to $C_4$ hydroxyalkyl or a linear or branched $C_1$ to Ca alkyl moiety containing one or more ether linkages, and $R^L$ is another linking group for covalently linking the compound of Formula (I) to the organic polymer resin.

8. The metal-chelating resin of claim 5, wherein the linking group is represented by the formula —$(CH_2)_x$—$NHR^5$ where x is 2 to 6, and $R^5$ is hydrogen.

9. The metal-chelating resin of claim 5, wherein the linking group is represented by the formula —$(CH_2)_x$—$NHR^5$ where x is 2 to 6, and $R^5$ is methyl.

10. The metal-chelating resin of claim 5, wherein the linking group is represented by the formula —$(CH_2)_x$—$NHR^5$ where x is 2 to 6, and $R^5$ is ethyl.

11. The metal-chelating resin of claim 1, wherein the compound of Formula (I) is represented by a compound having the structure of Formula (Ia):

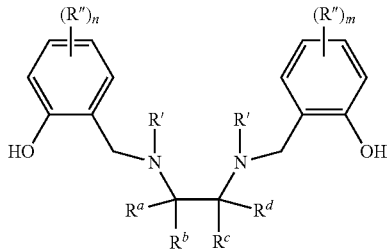

(Ia)

wherein:
R" is independently hydrogen or a linking group for covalently linking the compound of Formula (Ia) to the organic polymer resin, wherein at least one of R" is a linking group represented by the formula —$(CH_2)_x$—$NHR^5$ where x is 2 to 6, and $R^5$ is independently hydrogen, methyl or ethyl;

R' is independently a protonated or deprotonated, substituted or unsubstituted carboxyalkyl-containing moiety, wherein the alkyl group is a substituted or unsubstituted methylene group or a substituted or unsubstituted ethylene group optionally containing another linking group for covalently linking the compound of Formula (Ia) to the organic polymer resin;

m and n are independently integers from 1 to 4; and;

$R^a$, $R^b$, $R^c$ and $R^d$ are hydrogen.

12. The metal-chelating resin of claim 11, wherein $R^3$ is hydrogen.

13. The metal-chelating resin of claim 11, wherein $R^5$ is methyl.

14. The metal-chelating resin of claim 11, wherein $R^5$ is ethyl.

15. The metal-chelating resin of claim 11, wherein R' is independently a protonated or deprotonated, unsubstituted carboxymethyl moiety.

16. The metal-chelating resin of claim 11, wherein R' is independently a protonated or deprotonated, unsubstituted carboxyethyl moiety.

* * * * *

UNITED STATES PATENT AND TRADEMARK OFFICE
CERTIFICATE OF CORRECTION

PATENT NO. : 12,180,328 B2
APPLICATION NO. : 17/736537
DATED : December 31, 2024
INVENTOR(S) : Haymore et al.

Page 1 of 1

It is certified that error appears in the above-identified patent and that said Letters Patent is hereby corrected as shown below:

In the Claims

Claim 12, Column 38, Line 10, delete "wherein $R^3$ is" and insert therefor --wherein $R^5$ is--

Signed and Sealed this
Fourth Day of February, 2025

Coke Morgan Stewart
*Acting Director of the United States Patent and Trademark Office*